(12) United States Patent
Yamada et al.

(10) Patent No.: US 6,717,738 B2
(45) Date of Patent: Apr. 6, 2004

(54) OPTICAL ELEMENT, METAL MOLD FOR PRODUCING OPTICAL ELEMENT AND PRODUCTION METHOD FOR OPTICAL ELEMENT

(75) Inventors: Masahiro Yamada, Kanagawa (JP); Tetsu Watanabe, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/148,667

(22) PCT Filed: Oct. 4, 2001

(86) PCT No.: PCT/JP01/08752

§ 371 (c)(1),
(2), (4) Date: Jun. 3, 2002

(87) PCT Pub. No.: WO02/29450

PCT Pub. Date: Apr. 11, 2002

(65) Prior Publication Data

US 2003/0021042 A1 Jan. 30, 2003

(30) Foreign Application Priority Data

Oct. 4, 2000 (JP) .......................... 2000-305122
Feb. 27, 2001 (JP) .......................... 2001-051736

(51) Int. Cl.[7] .................... G02B 9/00; B29D 11/00; C03B 19/00
(52) U.S. Cl. ................ 359/642; 359/796; 264/1.1; 65/47
(58) Field of Search ................ 359/642, 796, 359/811; 264/1.1, 2.5–2.7; 425/808, 351, 352; 65/47

(56) References Cited

U.S. PATENT DOCUMENTS 4,789,324 A * 12/1988 Akhavi ................ 425/352
5,479,049 A * 12/1995 Aoki et al. ................ 257/642
6,324,149 B1 * 11/2001 Mifune et al. .......... 369/112.01
6,449,221 B1 * 9/2002 Knight et al. ............. 369/13.35

FOREIGN PATENT DOCUMENTS

| JP | 3-283572 | 12/1991 |
| JP | 5-232302 | 9/1993 |
| JP | 6-300903 | 10/1994 |
| JP | 7-181303 | 7/1995 |
| JP | 10-142404 | 5/1998 |
| JP | 2000-111710 | 4/2000 |
| JP | 2000-149306 | 5/2000 |
| JP | 2000-191398 | 7/2000 |
| JP | 2001-221903 | 8/2001 |
| JP | 2001-311803 | 9/2001 |

* cited by examiner

*Primary Examiner*—Georgia Epps
*Assistant Examiner*—William Choi
(74) *Attorney, Agent, or Firm*—Rader, Fishman & Grauer, PLLC; Ronald P. Kananen

(57) ABSTRACT

An approximately rectangular parallelopiped shaped optical element 100 has a substrate (base) 101, a lens 102, and an axially symmetric convex portion 103D formed in an upper surface 100U of the substrate 101. The radius of curvature of the surface of this convex portion 103D is approximately constant. The substrate 101 has an axially symmetric concave portion 101B in a bottom surface 100B of the substrate 101. A radius of curvature of the surface of this concave portion 101B is approximately constant. The concave portion 101B is filled with an optical material having a refractive index different from the substrate 101, thereby forming the lens 102. A flat portion 103E is formed around the convex portion 103D. Axes of symmetry of the convex portion 103D and the concave portion 101B are positioned on an identical straight line and are vertical with respect to the flat portions 103E and 101C.

46 Claims, 23 Drawing Sheets

OPTICAL ELEMENT, METAL MOLD FOR PRODUCING OPTICAL ELEMENT AND PRODUCTION METHOD FOR OPTICAL ELEMENT

TECHNICAL FIELD

The present invention relates to an optical element, a mold of producing the optical element, and a method of producing the optical element.

BACKGROUND ART

As the conventional methods for producing a conventional optical element, there is known, for example, a method for producing an optical element wherein molten glass or another optical material is filled into a mold having a cavity formed to the desired lens shape to produce a molded lens.

Also, there is known a method for producing an optical element wherein reactive ion etching (RIE) or another etching method is applied to etch an optical material to a desired lens shape by using a photoresist as an etching mask.

Further, there is known a method for producing an optical element wherein an optical material is mechanically polished to form a desired lens shape.

In a data storage apparatus such as a magneto-optic disk apparatus or DVD (digital versatile disk) apparatus an optical head is arranged close to the surface of a disk-like data recording medium and a converged laser beam is exposed onto a data recording media surface to record data on data recording medium or read data from the data recording medium.

When trying to raise a recording density of data in order to achieve a larger capacity of data recording in such a data storage apparatus, the laser beam must be sharply converged and exposed on the surface of the data recording medium, and it is necessary to use an object lens having a high numerical aperture (NA). In this case, if a large sized lens is used, the optical head ends up becoming large, then, a diameter of the lens must be kept at a small size. Accordingly, this means usage of a lens having a high numerical aperture and having a small size. As a result, it becomes necessary to arrange the lens extremely close to the surface of the data recording medium.

A floating type optical head operates in a state forming a thin air gap with the surface of the high speed rotating data recording medium and slightly floating from the surface of the data recording medium, so enables the lens to be arranged close to the surface of the data recording medium and, accordingly, is advantageous for achieving a higher density of recorded information. The floating type optical head can be constituted by the above optical element.

FIGS. 19A to 19E are views of production processes for producing an optical element applied to a conventional floating type optical head and show side sectional views of the optical element at different stages of the production process. Referring to these drawings, a method for producing a conventional optical element will first be explained. In this example, an object lens having a high numerical aperture obtained by combining an ordinary lens 2112 and a ball lens 2106 is used to form an optical element.

As shown in FIG. 19A, at the center of a flat slider substrate 2102 rectangular when seen from a plan view, first, a lens holding hole 2104 conical in shape and passing through the slider substrate 2102 is formed. As shown in FIG. 19B, a spherical ball lens 2106 is dropped into this hole 2104 and fixed by bonding, then a portion 2106A of the ball lens 2106 projecting from the lens holding hole 2104 is polished to the same level as the bottom surface of the slider substrate 2102 as shown in FIG. 19C. The bottom surface of the slider substrate 2102 flattened in this way and the bottom surface of the ball lens 2106 become surfaces slightly floating from the surface of the data recording medium.

Next, as shown in FIG. 19D, in order to form two floating use rails 2108 and 2108 at the two end portions of the bottom surface of the slider substrate 2102, two grooves 2110 and 2110 sandwiching the ball lens 2106 is formed by for example dry etching such as ion milling or RIE (reactive ion etching) and selective etching utilizing semiconductor photolithography.

Finally, a lens 2112 (for example, a molded glass lens) formed by another process is arranged and fixed by bonding on the slider substrate 2102 so as to close the opening of the lens holding hole 2104, whereby an optical element 2114 is completed.

In the above conventional method for producing an optical element, for example, the method for producing a molded lens, the formation of the cavity is troublesome in work.

In the above conventional method for producing an optical element, for example, the method for producing an optical element using RIE or another etching technique, the use of the optical material is restricted. There are few optical materials having a high refractive index giving a lens having a large numerical aperture NA among optical materials capable of RIE or other etching.

Also, a method of production for producing a plurality of optical systems is demanded from the viewpoint of reducing the production costs of optical systems.

Further, when forming a floating type optical head by using the above optical element, in order to record data on the data recording medium at a high density and reproduce data recorded at a high density from the data recording medium, it is necessary to sharply converge the laser beam and expose the converged beam on a specific position on the data recording medium with a good precision. Accordingly, when forming the conventional floating type optical head 2114, an extremely high precision is required particularly in the work for formation and assembly of the lens, the work took a long time, skill was necessary. Also, it was necessary to form the parts used with a very high precision too.

For example, the lens holding hole 2104 must be formed in the slider substrate 2102 with a high precision, and the ball lens 2106 must be arranged and fixed in the lens holding hole 2104 with a high precision. Also, in order to form the ball lens 2106 an extremely high sphericity and precision of radius are required. Further, in the polishing of the ball lens 2106 projecting from the lens holding hole 2104, it is necessary to control the amount of polishing with a high precision so that the polished level becomes the same as the surface of the slider substrate 2102. Further, when arranging the lens 2112 on the lens holding hole 2104 as well, the lens must be positioned with an extremely high precision of the $\mu$m order three-dimensionally. This positioning has been conventionally carried out by observing aberration etc, and the lens 2112 has a shape as a double convex lens so is hard to handle. As a result, the work takes a long time and skill becomes necessary.

As discussed above, high precision parts are necessary and the work efficiency is poor, therefore, in the end, the cost becomes high. Further, since the lens 2112 is arranged on the lens holding hole 2104 and the lens 2112 projects from the slider plate 2102, such the condition is disadvantageous from the point of reduction of the size.

Accordingly, an optical element which can be easily produced and which is advantageous in realizing a floating type optical head with an inexpensive production cost, a production use mold useable for the production of the optical element, and a method for producing the optical element have been sought.

The present invention was made in order to overcome the above disadvantages.

DISCLOSURE OF THE INVENTION

Accordingly, an object of the present invention is to provide an optical element which can be easily produced and is inexpensive in production cost, a production use mold useable for the production of the optical element, and a method for producing the optical element.

According to the present invention, the following optical element is provided: This optical element is an optical element having a substrate made of an optical material, the optical element characterized in that one surface of the substrate is formed with a convex portion having a first curvature, another surface facing the convex portion of the one surface of the substrate is formed with a concave portion having a second curvature, and the concave portion is filled with an optical material having a refractive index different from the substrate.

The convex portion and the concave portion can have shapes axially symmetric or approximately axially symmetric with respect to their optical axes, a first flat portion can be formed around the convex portion in the one surface, a second flat portion can be formed around the concave portion in the other surface, and the first and second flat portions can be made parallel or approximately parallel to each other.

The surface of the optical material filled in the concave portion and the second flat portion can be made parallel or approximately parallel to each other.

The surface of the optical material filled in the concave portion and the second flat portion can be positioned on the identical plane or approximately identical plane.

The optical axes of the convex portion and concave portion can be positioned on an identical straight line or approximately identical straight line.

The radii of curvature of the surfaces of the convex portion and the concave portion can be made constant or approximately constant.

Alternatively, an optical element of the present invention is an optical element having a substrate made of an optical material, characterized in that one surface of the substrate is formed with a hole and a bottom of the hole is formed with a convex portion having a first curvature.

The other surface facing the one surface of the substrate can be formed with a concave portion having a second curvature.

The convex portion and the concave portion can have a shape axially symmetric or approximately axially symmetric around their optical axes, a first flat portion can be formed around the hole in the one surface, a second flat portion can be formed around the concave portion in the other surface, and the first and second flat portions can be made parallel or approximately parallel to each other.

The convex portion at the bottom of the hole can be positioned between a plane passing through the first flat portion and the second surface.

The optical axes of the convex portion and concave portion can be positioned on an identical straight line or approximately identical straight line.

The radii of curvature of the surfaces of the convex portion and the concave portion can be made constant or approximately constant.

The concave portion can be filled with an optical material having a refractive index different from the substrate.

The surface of the optical material filled in the concave portion and the second flat portion can be made parallel or approximately parallel to each other.

The surface of the optical material filled in the concave portion and the second flat portion can be positioned on an identical plane or approximately identical plane.

Alternatively, the optical element of the present invention is an optical element including a substrate made of an optical material and a lens supported on the substrate, characterized in that the substrate is formed by a transparent material of a first refractive index, the lens is formed as a lens obtained by filling a concave portion formed in one surface of the substrate with a transparent material having a second refractive index different from the transparent material, and a surface of the substrate on the lens side is formed with floating use rails integral with the substrate.

The substrate can be formed by silica-based glass.

The surface of the substrate on the lens side may be coated with a protective film made of a transparent material having a higher hardness than the transparent material forming the substrate and containing carbon as a principal component.

The surface of the substrate at the lens side and the protective film may have formed between them a second protective film made of a transparent material having a higher hardness than the substrate but having a lower hardness than the protective film.

The second protective film can be formed by alumina, silica-based material, or silicon nitride.

Alternatively, an optical element of the present invention is an optical element including a substrate made of an optical material and a lens supported on the substrate, the optical element characterized in that the substrate includes first and second substrates formed by transparent materials, the lens is formed as a lens obtained by filling a concave portion having a first curvature formed in one surface of the first substrate with a transparent material having a second refractive index different from the refractive index of the transparent material forming the first substrate, the second substrate is made of a transparent material having a higher hardness than the transparent material for forming the first substrate, the surface is arranged so as to face the surface of the first substrate on the lens side and be in close contact with the first substrate, floating use rails are formed on the surface of the second substrate on an opposite side to the first substrate integrally with the second substrate, and the surface of the second substrate on the floating rail side is coated with a transparent protective film having a higher hardness than the transparent material forming the second substrate and containing carbon as a principal component.

The transparent material forming the first substrate can be made silica-based glass.

The transparent material forming the second substrate can be made alumina, silica-based glass, or silicon nitride.

The protective film can be made a diamond-like carbon film.

A thickness of the protective film is preferably set to at least 5 nm.

Further, a production use mold of an optical element of the present invention is a production use mold of an optical element made of an optical material, characterized by comprising a cavity to be filled with the optical material in a molten state or a softened state and a first pin forming a convex portion or a concave portion with respect to the optical material in the cavity, wherein the first pin penetrates through a wall of the cavity from the outside, a front end of the first pin has a concave shape sunken with a first curvature at its center.

The front end of the first pin can have a shape axially symmetric or approximately axially symmetric with respect to the axial center.

At the front end of the first pin, a radius of curvature of the center portion can be made constant or approximately constant.

The first pin can be made one penetrating through the wall of the cavity from the outside and projecting into the cavity.

At the wall of the cavity, a periphery of a region through which the first pin penetrates can be made flat and the bottom of the concave shape in the front end of the first pin can be positioned between a plane passing through the periphery of the first pin at the wall of the cavity and an opposing wall facing the wall of the cavity.

The mold can further have a second pin for forming a positioning use mark at the optical material in the cavity, and the second pin can penetrate through the wall of the cavity from the outside.

Further, a method for producing an optical element of the present invention is a method for producing an optical element using a disk-like first substrate formed with a plurality of first lenses and a plurality of positioning use first marks and made of an optical material and a disk-like second substrate formed with a plurality of second lenses corresponding to the plurality of first lenses and a plurality of positioning use second marks corresponding to the plurality of positioning use first marks and made of an optical material to produce an optical element, the method for producing an optical element characterized in that an arrangement of center positions of the plurality of first lenses and the positions of the plurality of first marks on the surface of the disk-like first substrate coincides with the arrangement of center positions of the corresponding plurality of second lenses and the positions of the plurality of second marks on the surface of the disk-like second substrate and in that the method includes a step of bonding the first and second substrates so that the first and second marks are superimposed and a step of separating the bonded first and second substrates into individual optical elements comprised by the first and second lenses.

The plurality of first marks can be formed on an opposing surface facing the second substrate in the surface of the first substrate, and the plurality of second marks can be formed on an opposing surface facing the first substrate in the surface of the second substrate.

The first substrate can be formed with a plurality of holes corresponding to the plurality of first lenses, bottom surfaces of the plurality of holes can be formed with convex portions having axially symmetric shapes about their axial centers, and the convex portions can constitute the first lenses.

Alternatively, a method for producing an optical element of the present invention is a method for producing an optical element including a substrate made of an optical material and a lens supported on the substrate, the method for producing an optical element characterized by including the steps: preparing a transparent substrate having a lens formed by filling a concave portion of one surface with a transparent material, forming a photoresist film on the surface of the substrate at the lens side, patterning the lens portion and the photoresist film to the shape of a support by photolithography, dry etching the surface of the substrate using the photoresist film as a mask to form grooves, then removing the photoresist film to obtain the optical element.

The substrate can be formed by glass.

After removing the photoresist film, the surface of the lens side of the substrate can be coated by a protective film having a higher hardness than the transparent material forming the substrate and containing carbon as a principal component.

After removing the photoresist film and before the formation of the protective film, the surface of the substrate can be formed with a second protective film made of a transparent material having a higher hardness than the substrate but having a lower hardness than the protective film.

The second protective film can be formed by alumina, silica-based glass, or silicon nitride.

Alternatively, a method for producing an optical element of the present invention is a method for producing an optical element including a substrate made of an optical material and a lens supported on the substrate, the method for producing an optical element characterized by including the steps of: preparing a transparent first substrate having a lens formed by filling a concave portion of one surface with a transparent material, depositing on the surface on the lens side of the first substrate a transparent material having a higher hardness than the first substrate to obtain a second substrate in close contact with the first substrate, forming a photoresist film on the surface of the second substrate at the side opposite to the first substrate, patterning the photoresist film to the shape of floating use rails by photolithography, dry etching the surface of the second substrate using the photoresist mask as a mask to form grooves in the surface of the second substrate, then removing the photoresist film to obtain the optical element.

Alternatively, a method for producing an optical element of the present invention is a method for producing an optical element including a substrate made of an optical material and a lens supported on the substrate, the method for producing an optical element characterized in that the optical element is formed by bonding with a transparent first substrate having a lens formed by filling a concave portion of one surface with a transparent material a second substrate made of a transparent material having a higher hardness than the first substrate while making its surface face the surface on the lens side of the first substrate and in that it comprises the steps of: forming a photoresist film on the surface of the second substrate on the opposite side to the first substrate before bonding the second substrate to the first substrate or after bonding the second substrate to the first substrate, patterning the photoresist film to the shape of floating use rails by photolithography, dry etching the surface of the second substrate using the photoresist mask as a mask to form grooves in the surface of the second substrate, then removing the photoresist film to obtain the optical element.

The first substrate can be formed by glass.

The second substrate can be formed by alumina, silica-based glass, or silicon nitride.

After removing the photoresist film on the second substrate, a protective film having a higher hardness than the second substrate and containing carbon as a principal component can be formed on the surface of the groove side.

The protective film containing carbon as a principal component can be a diamond-like carbon film.

The protective film is preferably formed to a thickness of at least 5 nm.

BEST MODE FOR WORKING THE INVENTION

Figure 1:
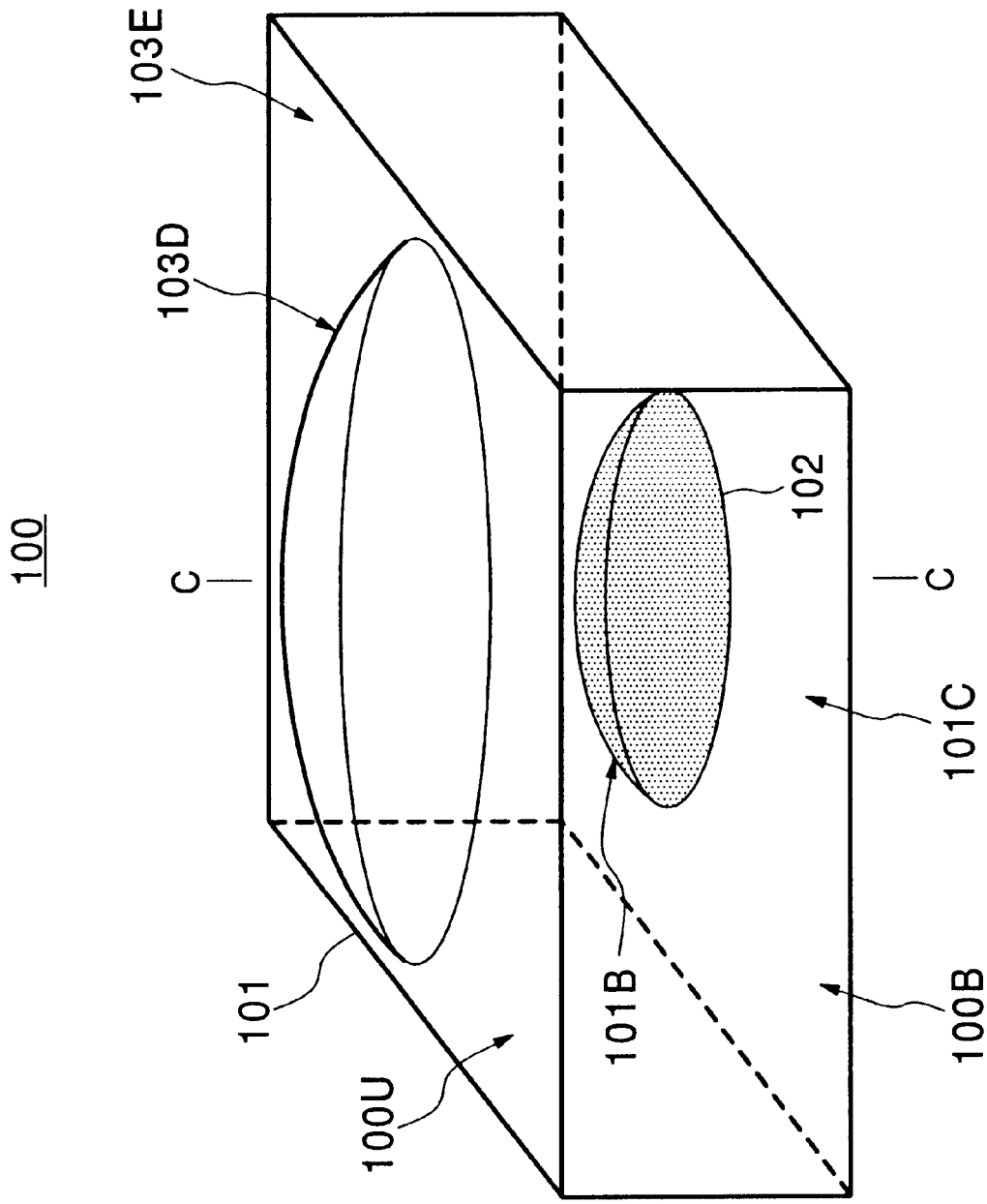
FIG. 1 is a schematic view of the configuration of a first embodiment of an optical element according to the present invention.

Preferred embodiments of the present invention will be explained by referring to the drawings.

FIG. 1 is a schematic view of the configuration of a first embodiment of an optical element according to the present invention.

This optical element 100 is shaped as a rectangular parallelopiped or approximately rectangular parallelopiped having a square or substantially square shape in plan view and having a height smaller than one side of the four sides one surface 100U of which is formed with a convex portion 103D. The optical element 100 has a substrate (base) 101 and a lens 102.

The substrate 101 and lens 102 of the optical element 100 have refractive indexes different from each other. Light can be refracted at a boundary of the substrate 101 and the lens 102. Also, light can be refracted at the surface of the convex portion 103D.

The substrate 101 has an axially symmetric or approximately axially symmetric concave portion 101B in a bottom surface 100B of the substrate 101. The radius of curvature of the surface of this concave portion 101B is constant or approximately constant.

The concave portion 101B is filled with an optical material having a refractive index different from that of the substrate 101. The lens 102 is formed by the concave portion 101B filled by the optical material.

Further, a convex curved surface of the lens 102 is in close contact with the surface of the concave portion The bottom surface of the lens 102 is flat or approximately flat and becomes parallel or approximately parallel to a flat portion 103E of the upper surface 100U of the optical element 100. Also, the bottom surface of the lens 102 and a flat portion 101C of the bottom surface 100B of the substrate 101 become parallel or approximately parallel to the flat portion 103E of the upper surface 100U and are positioned on the identical plane in FIG. 1.

The substrate 101 has an axially symmetric or approximately axially symmetric convex portion 103D on the upper surface 100U of the substrate 101. The surface of this convex portion 103D has a constant or approximately constant radius of curvature. The flat portion 103E is formed around the convex portion 103D.

Axes of symmetry of the convex portion 103D and the concave portion 101B of the substrate 101 are positioned on the identical straight line or approximately identical straight line and become vertical or approximately vertical to the flat portions 103E and 101C. Corresponding to this, the optical axes of the convex portion 103D and the lens 102 constituting the lens are positioned on the identical straight line or approximately identical straight line.

When the material of the substrate 101 is made for example moldable optical glass and the material of the lens 102 is made for example niobium oxide ($NbO_2$) which has a higher refractive index than optical glass, since the lens 102 has a larger refractive index than the substrate 101, the function of the convex portion can be imparted to the lens 102. As the material of the lens 102, other than niobium oxide, use can be made of for example tantalum oxide, titanium oxide, gallium phosphate (gallium phosphorus), gallium nitride, or a tantalum-titanium-oxygen compound.

The refractive index of the lens 102 is made higher than the refractive index of the substrate 101. As the substrate 101, usually use is made of an optical material having a higher refractive index than air and having a high strength, for example, silica-based glass, a plastic resin, or other light transmitting material.

Note that the optical element 100 is suitable for a floating type optical head arranged close to the surface of a disk-like data recording medium and focusing a converged laser beam on the surface of a data recording medium to record data on the data recording medium or read data from the data recording medium in a magneto-optic disk apparatus or DVD apparatus or other data storage apparatus. The optical elements of the second to ninth embodiments explained below are suitable for a floating type optical head.

FIGS. 2A to 2D are schematic explanatory views of an embodiment of a method for producing the optical element 100.

Figure 2A:
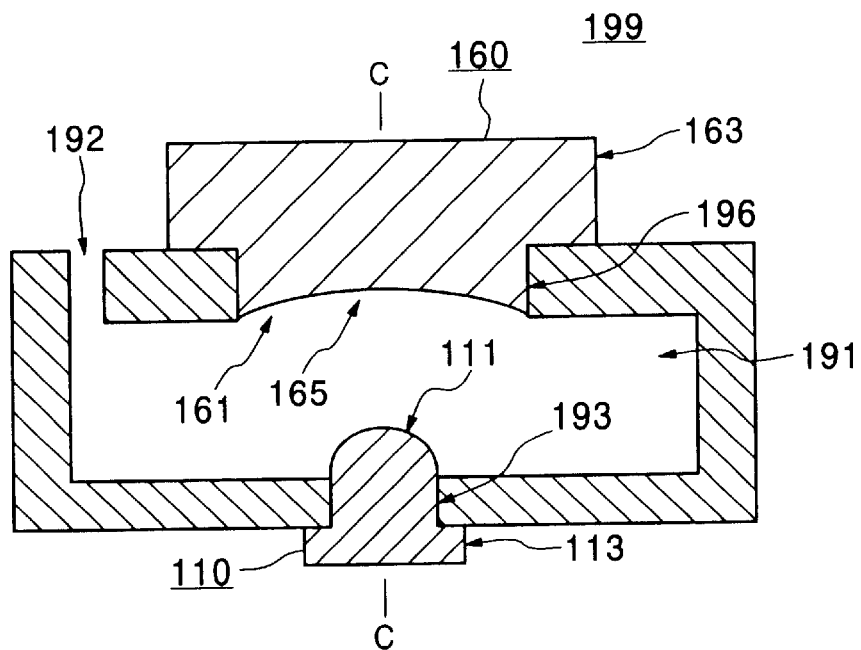
FIGS. 2A to 2D are views of an embodiment of a method for producing an optical element of FIG. 1.

FIG. 2A is a view showing a schematic sectional view of a production use mold 199 used for the production of the optical element 100. This mold 199 is formed with a passage 192 for passing an optical material in the molten state or softened state therethrough and a cavity 191.

Further, in the cavity 191 of the mold 199, part of the convex portion 111 of the mold pin 110 projects from the bottom surface of the cavity 191 into the cavity 191. In the bottom surface of the cavity 191, the periphery of the convex portion 111 is flat.

The mold pin 110 has a head 113 having a flat shape and the convex portion 111 projecting from the head 113 in the vertical direction. The head 113 of the mold pin 110 is in close contact with the bottom surface of the mold 199, while the convex portion 111 of the mold pin 110 penetrates through a through hole 193 provided in the bottom wall of the mold 199 and partially projects into the cavity 191.

In the cavity 191 of the mold 199, part of a convex portion 161 of the mold pin 160 is exposed in the cavity 191 from the upper wall of the cavity 191. In the upper wall of the cavity 191, the area around the convex portion 161 is flat.

The front end of the convex portion 161 of the mold pin 160 has a concave shape having a center portion 165 sunken in the form of an arc. The radius of curvature of the surface of the center portion 165 is constant or approximately constant.

The mold pin 160 has a head 163 having a flat shape and the convex portion 161 projecting from the head 163 in the vertical direction. The head 163 of the mold pin 160 is in close contact with the upper surface of the mold 199. The convex portion 161 of the mold pin 160 penetrates through a through hole 196 provided in the upper wall of the mold 199. The height of a rim of the front end of the convex portion 161 from the seat surface of the head 163 is the same or approximately the same as the thickness of the upper wall of the mold 199, and the rim of the through hole 196 and the rim of the front end of the convex portion 161 of the mold pin 160 are in close contact.

The mold 199 is configured with the pins 110 and 160 penetrating through the wall of the cavity 191, so the lens 102 and convex portion 103D having curvatures in accordance with the shape of the convex portion 111 of the pin 110 and the shape of the center portion 165 of the pin 160 can be produced. Further, the fabrication of the mold can be simplified in comparison with a case where the wall of the cavity is processed to provide lens shaped concave and convex portions.

Figure 2B:
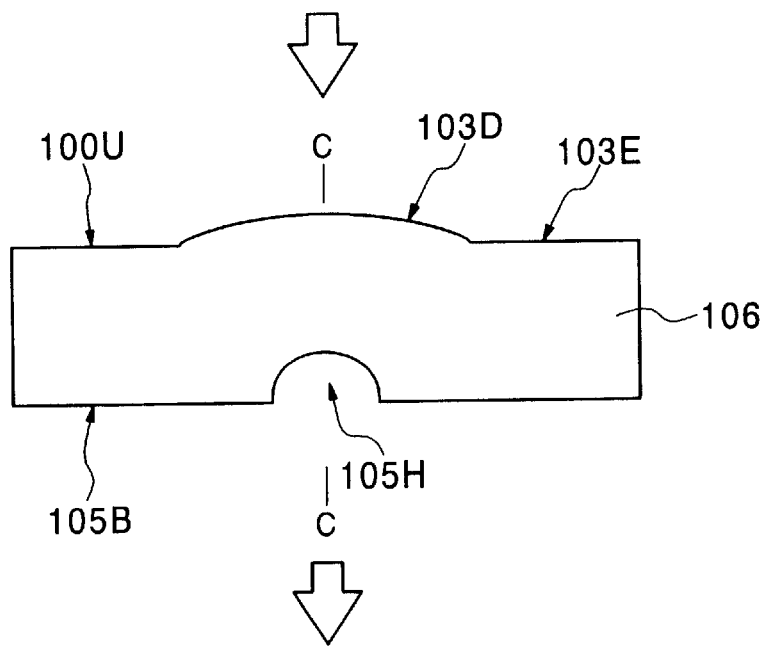

FIG. 2B is an explanatory view of a shaped article produced by the production use mold 199 of the optical element of FIG. 2A.

In a state pressing the mold pins 110 and 160 provided facing each other across the cavity 191 toward the cavity 191, an optical material in the molten state or softened state is filled into the cavity 191 of the mold 199 of FIG. 2A from the passage 192, this optical material is hardened, the mold 199 is opened, and the shaped article (molded article) is taken out. Then, the portion corresponding to the passage 192 is removed from the shaped article, whereby a shaped article comprised of the substrate 106 as shown in FIG. 2B can be obtained. Alternatively, the optical material is filled, then the portion corresponding to the passage 192 is removed from the filled optical material in the molten state or softened state, the remainder is hardened, the mold 199 is opened, and the shaped article is taken out, whereby a shaped article comprised of the substrate 106 as shown in FIG. 2B can be obtained.

Note that it is also possible to employ for example silica-based glass, a plastic synthetic resin, etc. in molten state or softened state as the optical material to be injected into the cavity 191.

A bottom surface 105B of the substrate 106 is formed with a hole 105H obtained by transfer of the convex portion 111 of the mold pin 110. The periphery of the hole 105H is flat.

The upper surface 100U of the substrate 106, the convex portion 103D obtained by the transfer of the front end of the convex portion 161 of the mold pin 160 is formed, and the flat portion 103E is formed around the convex portion 103D. The optical axes C—C of the convex portion 103D and the hole 105H coincide or approximately coincide.

Figure 2C:
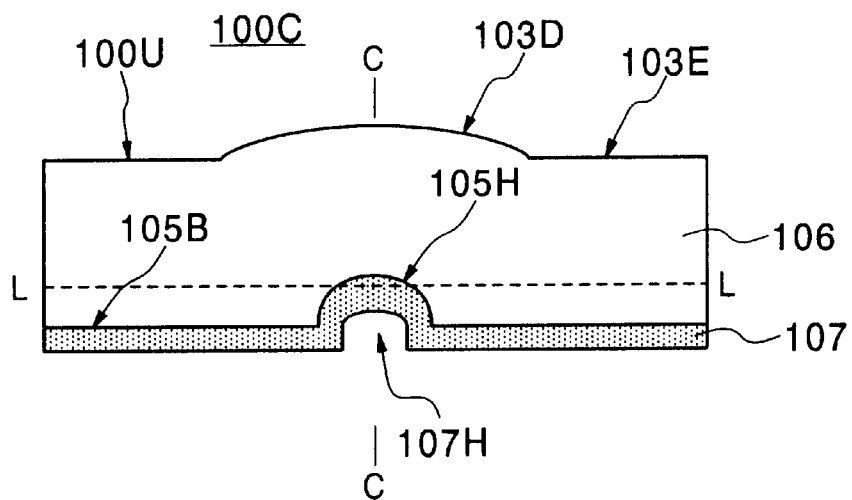

FIG. 2C is a view showing a state where a layer 107 of the optical material is deposited on the bottom surface 105B of the substrate 106 of FIG. 2B. In the shaped article 100C, the substrate 106 and the layer 107 have different refractive indexes.

As the layer 107 of the optical material, an optical material having a higher refractive index than the substrate 106, for example, niobium oxide ($NbO_2$), is deposited on the bottom surface 105B by for example sputtering, vapor deposition, ion plating, or another technique. By the deposition of the layer 107, the optical material is filled in the hole 105H of the substrate 106. The surface of the layer 107 is formed with a hole 107H corresponding to the hole 105H.

Figure 2D:
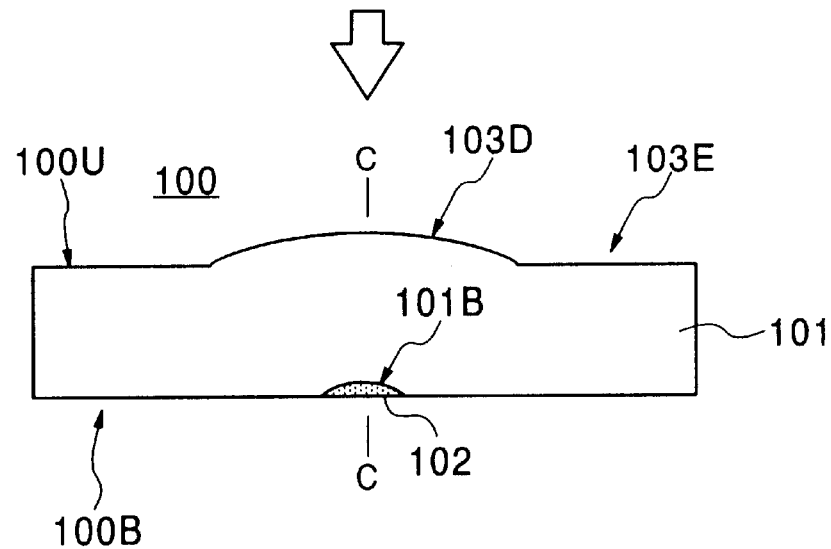

FIG. 2D is a view showing an optical element produced from the shaped article shown in FIG. 2C. In this optical element 100, the layer 107 and the bottom surface 105B of the shaped article 100C shown in FIG. 2C are polished to a plane L—L indicated by a broken line and the polished surface (lens bottom surface) is flattened, whereby the substrate 106 of FIG. 2C becomes the substrate 101.

The optical element 100 is polished or ground leaving the concave portion 101B having a constant or approximately constant radius of curvature in the hole 105H. In the optical element 100, the optical material filled in the hole 105H is exposed at the bottom surface 100B and the lens 102 is formed. The polished surface or ground surface of this optical material and the bottom surface 100B are positioned on the identical plane.

Figure 3:
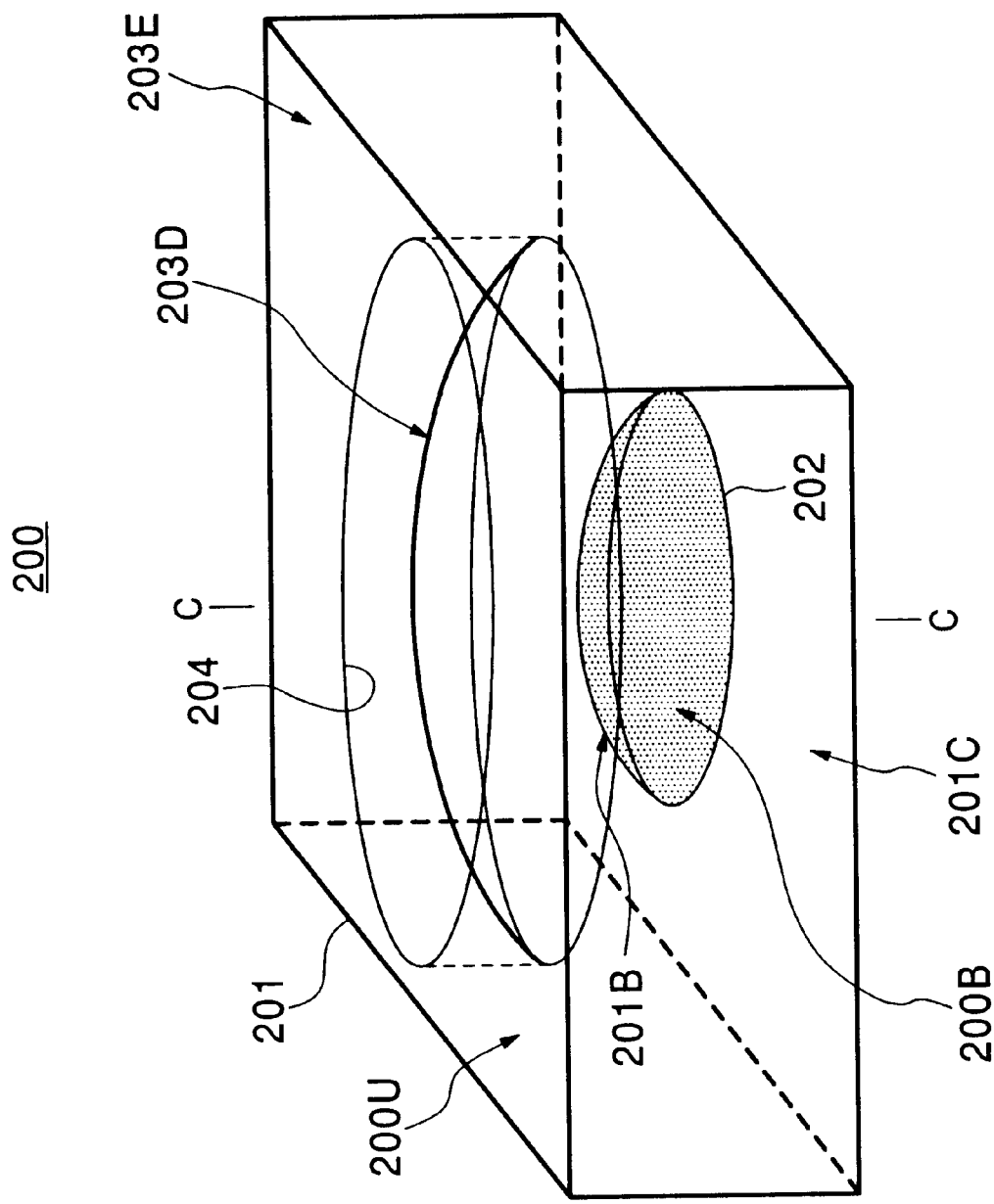
FIG. 3 is a schematic view of the configuration of a second embodiment of an optical element according to the present invention.

FIG. 3 is a schematic view of the configuration of a second embodiment of the optical element according to the present invention.

This optical element 200 is shaped as a rectangular parallelopiped or approximately rectangular parallelopiped having a square or substantially square shape in plan view and having a height smaller than one side of the square one surface 200U of which is formed with a hole 204 and formed with a convex portion 203D at the bottom of the hole 204. The optical element 200 has a substrate (base) 201 and a lens 202 formed by the optical material.

The substrate 201 and lens 202 of the optical element 200 have refractive indexes different from each other. Light can be refracted at the boundary of the substrate 201 and the lens 202. Also, light can be refracted at the surface of the convex portion 203D.

The substrate 201 has a concave portion 201B axially symmetric or approximately axially symmetric with respect to the optical axis C—C at the bottom surface 200B of the substrate 201. The radius of curvature of the surface of this concave portion 201B is constant or approximately constant.

The concave portion 201B is filled with an optical material having a different refractive index from that of the substrate 201, preferably a higher refractive index. The lens 202 is formed by the concave portion 201B filled with the optical material.

Further, the convex curved surface of the lens 202 is in close contact with the surface of the concave portion 201B.

The bottom surface of the lens 202 is flat or approximately flat and becomes parallel or approximately parallel to a flat portion 203E of the upper surface 200U of the optical element 200. Also, the bottom surface of the lens 202 and a flat portion 201C of the bottom surface 200B of the substrate 201 become parallel or approximately parallel and are positioned on the identical plane in FIG. 3.

The substrate 201 has a convex portion 203D axially symmetric or approximately axially symmetric with respect to the optical axis C—C on the bottom of the hole 204 of the upper surface 200U. The surface of this convex portion 203D has a constant or approximately constant radius of curvature. The flat portion 203E is formed at the periphery of the hole 204. The convex portion 203D is positioned between the plane passing through the flat portion 203E and the bottom surface 200B.

The optical axis C—C passing through the convex portion 203D and the concave portion 201B of the substrate 201 are positioned on an identical straight line or approximately identical straight line, and become vertical or approximately vertical with respect to the flat portions 203E and 201C.

When making the material of the substrate 201 for example optical glass and making the material of the lens 202 for example niobium oxide having a higher refractive index than the optical glass, since the lens 202 has a larger refractive index than the substrate 201, the function of a convex lens can be imparted to the lens 202.

In the optical element 200, the convex portion 203D is sunken into the substrate 201, therefore another optical element having a flat surface similar to the optical element 200 can be deposited on the upper surface 200U. By combining lenses of the optical elements, it is possible to obtain a high numerical aperture and possible to reduce an error of inclination of the lenses combined.

FIGS. 4A to 4D are schematic explanatory views of an embodiment of the method for producing an optical element 200.

Figure 4A:
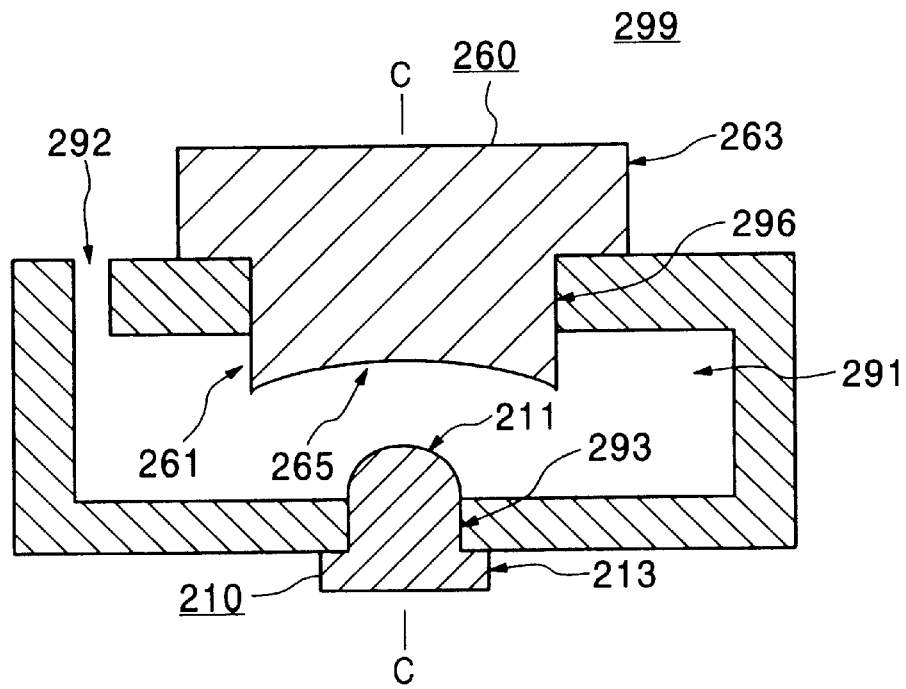
FIGS. 4A to 4D are views of an embodiment of the method for producing an optical element of FIG. 3.

FIG. 4A is a schematic sectional view of a production use mold 299 used for the production of the optical element 200. This mold 299 is formed with a passage 292 for passing the optical material in the molten state or softened state therethrough and a cavity 291.

Part of a convex portion 211 of a mold pin 210 projects from the bottom surface of the cavity 291 into the cavity 291. In the bottom surface of the cavity 291, the area around a through hole 293 in which the convex portion 211 is fitted is flat.

The mold pin 210 has a head 213 having a flat shape and the convex portion 211 projecting from the head 213 in the vertical direction. The head 213 of the mold pin 210 is in close contact with the bottom surface of the mold 299. The convex portion 211 of the mold pin 210 penetrates through the through hole 293 provided in the bottom wall of the mold 299 and partially projects into the cavity 291.

Part of a convex portion 261 of a mold pin 260 is exposed from the upper wall of the cavity 291 in the cavity 291. In the upper wall of the cavity 291, the periphery of the through hole 296 in which the convex portion 261 is fitted is flat.

The front end of the convex portion 261 of the mold pin 260 has a concave shape having a center portion 265 sunken in the form of an arc. The radius of curvature of the center portion 265 is constant or approximately constant.

The mold pin 260 has a head 263 having a flat shape and the convex portion 261 projecting from the head 263 in the vertical direction. The head 263 of the mold pin 260 is in close contact with the upper surface of the mold 299. The convex portion 261 of the mold pin 260 penetrates through a through hole 296 provided in the upper wall of the mold 299.

The mold 299 is configured with the pins 210 and 260 penetrating through the wall of the cavity 291, so the lens 202 and convex portion 203D having curvatures in accordance with the shape of the convex portion 211 of the pin 210 and the shape of the center portion 265 of the pin 260 can be produced. Further, the fabrication of the mold can be simplified in comparison with a case of processing the wall of the cavity to form the lens shaped concave and convex portions.

Figure 4B:
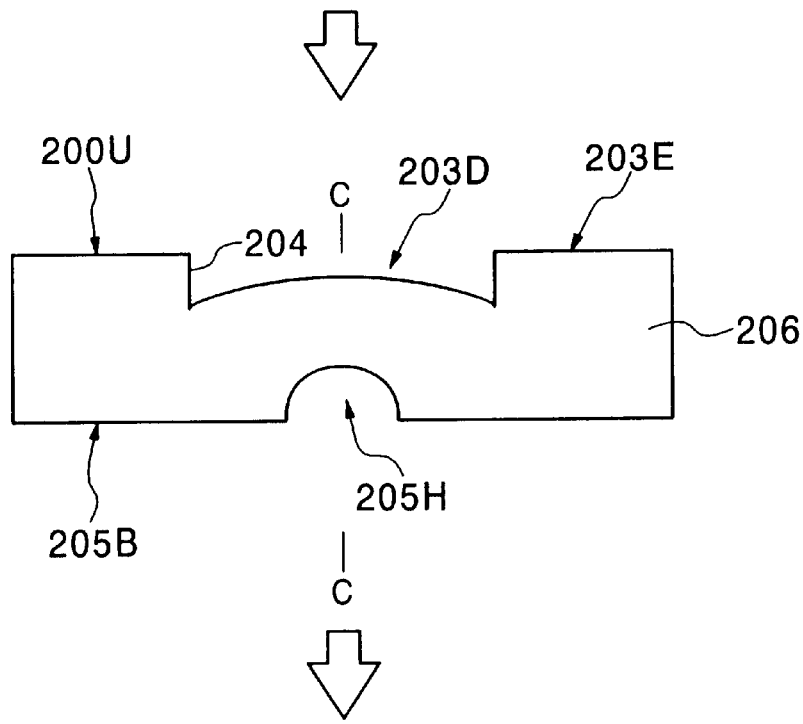

FIG. 4B is an explanatory view of a shaped article produced by the production use mold 299 of the optical element of FIG. 4A.

In a state pressing the mold pins 210 and 260 provided facing each other across the cavity 291 toward the cavity 291, an optical material in the molten state or softened state is filled into the cavity 291 of the mold 299 of FIG. 4A from the passage 292, this optical material is hardened, the mold 299 is opened, and the shaped article (molded article) is taken out. Then, the portion corresponding to the passage 292 is removed from the shaped article, whereby a shaped article comprised of the substrate 2106 as shown in FIG. 4B can be obtained. Alternatively, the optical material is filled in the cavity 291, then the portion corresponding to the passage 292 is removed from the filled optical material in the molten state or softened state, the remainder is hardened, the mold 299 is opened, and the shaped article is taken out, whereby a shaped article comprised of the substrate 206 as shown in FIG. 4B can be obtained.

Note that it is also possible to use for example silica-based glass, a plastic synthetic resin, etc. in a molten state or softened state as the optical material to be injected into the cavity 291.

A bottom surface 205B of the substrate 206 is formed with a hole 205H obtained by the transfer of the convex portion 211 of the mold pin 210. The area around the hole 205H is flat.

The upper surface 200U of the substrate 206 is formed with a hole 204 obtained by the transfer of the convex portion 261 of the mold pin 260, the bottom of this hole 204 is formed with a convex portion 203D, and the flat portion 203E is formed around the hole 204. The optical axes C—C of the convex portion 203D and the hole 205H coincide or approximately coincide.

Figure 4C:
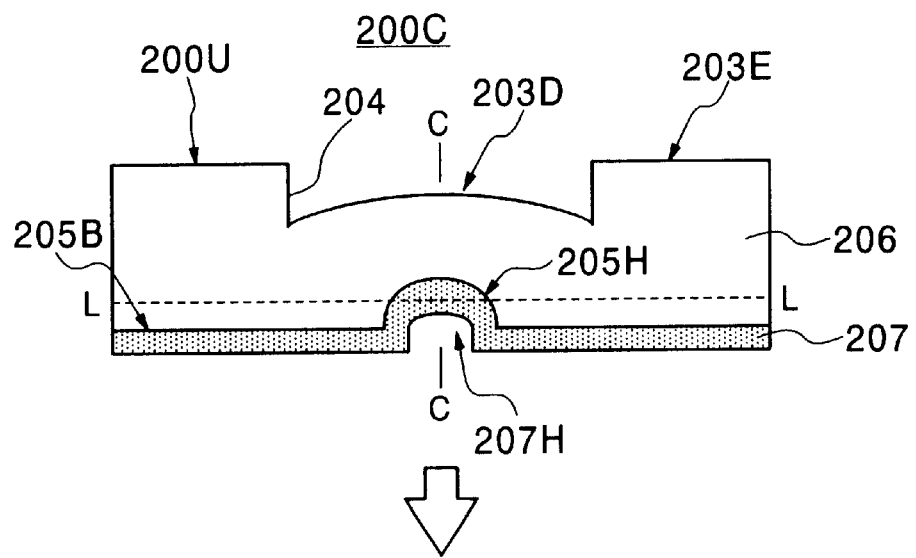

FIG. 4C is a view showing a state where a layer 207 of the optical material is deposited on the bottom surface 205B of the substrate 206 of FIG. 4B. In the shaped article 200C, the substrate 206 and the layer 207 have different refractive indexes.

As the layer 207 of the optical material, an optical material having a higher refractive index than the substrate 206, for example, niobium oxide, is deposited on the bottom surface 205B by for example sputtering, vapor deposition, ion plating, or another technique. By the deposition of the layer 207, the hole 205H of the substrate 206 is filled with the optical material. The surface of the layer 207 is formed with a hole 207H corresponding to the hole 205H.

Figure 4D:
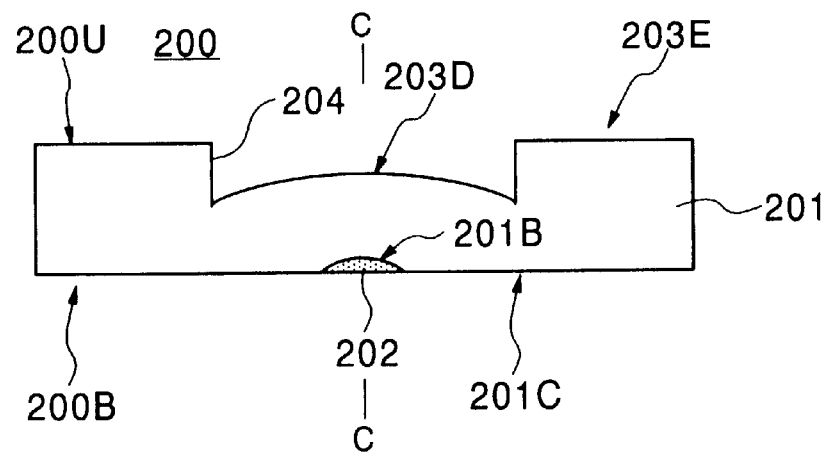

FIG. 4D is a view showing an optical element produced from the shaped article shown in FIG. 4C. In this optical element 200, the layer 207 and the bottom surface 205B of the shaped article 200C shown in FIG. 4C are polished to the plane L—L indicated by a broken line and the polished surface (lens bottom surface) is flattened, whereby the substrate 206 of FIG. 6C becomes the substrate 201.

The optical element 200 is polished or ground leaving the concave portion 201B having a constant or approximately constant radius of curvature in the hole 205H. In the optical element 200, the optical material filled in the hole 205H is exposed at the bottom surface 200B and the lens 202 is formed. The polished surface or ground surface of this optical material and the bottom surface 200B are positioned on the identical plane.

Figure 5:
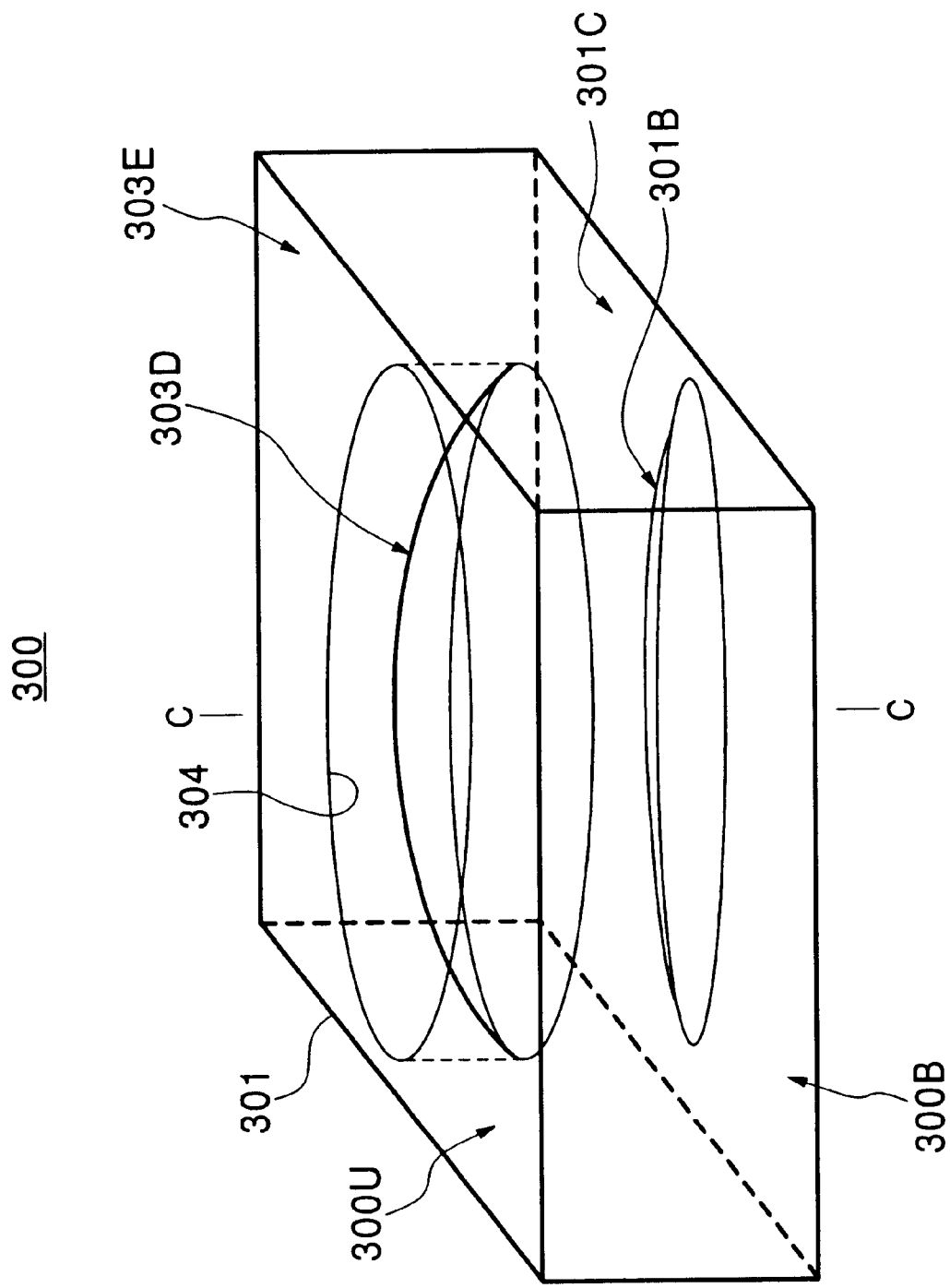
FIG. 5 is a schematic view of the configuration of a third embodiment of the optical element according to the present invention.

FIG. 5 is a schematic view of the configuration of a third embodiment of the optical element according to the present invention.

This optical element 300 is shaped as a rectangular parallelopiped or approximately rectangular parallelopiped having a square or substantially square shape in plan view and having a height smaller than one side of the square one surface 300U of which is formed with a hole 304 and formed with a convex portion 303D at the bottom of the hole 304. An opposing surface 300B facing the surface 300U forming the hole 304 is formed with a concave portion 301B.

The optical element 300 is comprised by a substrate (base) 301 of the optical material. Light can be refracted at the surface of the concave portion 301B and the convex portion 303D.

The substrate 301 has a concave portion 301B axially symmetric or approximately axially symmetric with respect to the optical axis C—C in the bottom surface 300B of the substrate 301 and is formed with a flat portion 301C at the periphery of this concave portion 301B. The radius of curvature of the surface of this concave portion 301B is constant or approximately constant.

The substrate 301 has the convex portion 303D axially symmetric or approximately axially symmetric with respect to the optical axis C—C at the bottom of the hole 304 of the upper surface 300U. The surface of the convex portion 303D has a constant or approximately constant radius of curvature. A flat portion 303E is formed around the hole 304. The convex portion 303D is positioned between the plane passing through the flat portion 303E and the bottom surface 300B.

The optical axes C—C passing through the convex portion 303D and the concave portion 301B of the substrate 301 are positioned on the identical straight line or approximately identical straight line and, at the same time, become vertical or approximately vertical with respect to the flat portions 303E and 301C.

The optical element 300 can be given a high numerical aperture by the combination of the convex portion 303D and the concave portion 301B.

Further, in the optical element 300, since the convex portion 303D is sunken into the substrate 301, another optical element having a flat surface similar to the optical element 300 can be deposited on the upper surface 300U. By combining lenses of the optical elements, it is possible to obtain a higher numerical aperture and possible to reduce the error of inclination of the lenses combined.

Figure 6A:
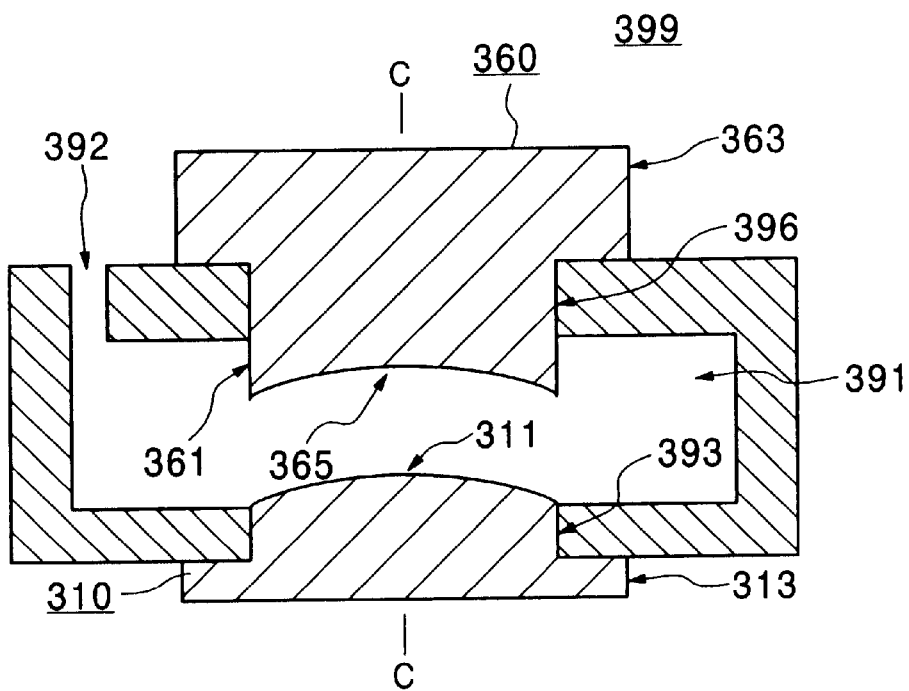
FIGS. 6A and 6B are views of an embodiment of the method for producing an optical element of FIG. 5.
Figure 6B:
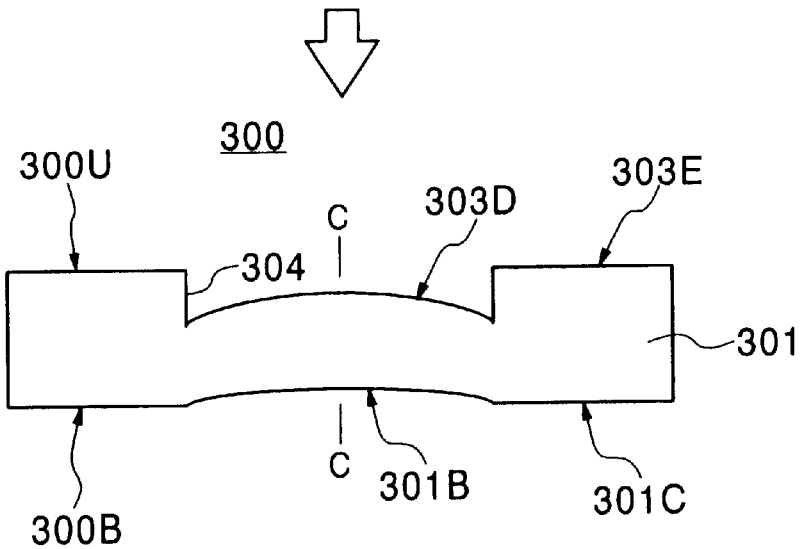

FIGS. 6A and 6B are schematic explanatory views of an embodiment of the method for producing an optical element 300.

FIG. 6A is a schematic sectional view of a production use mold 399 used for the production of the optical element 300. This mold 399 is formed with a passage 392 for passing the optical material in the molten state or softened state therethrough and a cavity 391.

Part of a convex portion 311 of a mold pin 310 projects from the bottom surface of the cavity 391 into the cavity 391. In the bottom surface of the cavity 391, the periphery of a through hole 393 in which the convex portion 311 is fitted is flat.

The mold pin 310 has a head 313 having a flat shape and the convex portion 311 projecting from the head 313 in the vertical direction. The head 313 of the mold pin 310 is in close contact with the bottom surface of the mold 399. The convex portion 311 of the mold pin 310 penetrates through the through hole 393 provided in the bottom wall of the mold 399 and partially projects into the cavity 391.

Part of a convex portion 361 of a mold pin 360 is exposed from the upper wall of the cavity 391 in the cavity 391. In the upper wall of the cavity 391, the periphery of the through hole 396 in which the convex portion 361 is fitted is flat.

The front end of the convex portion 361 of the mold pin 360 has a concave shape having a center portion 365 sunken in the form of an arc. The radius of curvature of the surface of the center portion 365 is constant or approximately constant.

The mold pin 360 has a head 363 having a flat shape and the convex portion 361 projecting from the head 363 in the vertical direction. The head 363 of the mold pin 360 is in close contact with the upper surface of the mold 399. The convex portion 361 of the mold pin 360 penetrates through a through hole 396 provided in the upper wall of the mold 399.

The mold 399 is configured with the pins 310 and 360 penetrating through the wall of the cavity 391, so the concave portion 301B and convex portion 303D having curvatures in accordance with the shape of the convex portion 311 of the pin 310 and the shape of the center portion 365 of the pin 360 can be produced. Further, the fabrication of the mold can be simplified in comparison with a case where the wall of the cavity is processed to provide lens shaped concave and convex portions.

FIG. 6B is an explanatory view of a shaped article produced by the production use mold 399 of the optical element of FIG. 6A.

In a state pressing the mold pins 310 and 360 provided facing each other across the cavity 391 toward the cavity 391, an optical material in the molten state or softened state is filled into the cavity 391 of the mold 399 of FIG. 6A from the passage 392, this optical material is hardened, the mold 399 is opened, and the shaped article (molded article) is taken out. Then, the portion corresponding to the passage 392 is removed from the shaped article, whereby an optical element 300 comprised by the substrate 301 as shown in FIG. 6B can be obtained. Alternatively, the optical material is filled in the cavity 391, then the portion corresponding to the passage 392 is removed from the filled optical material in the molten state or softened state, the remainder is hardened, the mold 399 is opened, and the shaped article is taken out, whereby the optical element 300 comprised of the substrate 301 as shown in FIG. 6B can be obtained.

Note that it is also possible to use for example silica-based glass, a plastic synthetic resin, etc. in a molten state or softened state as the optical material to be injected into the cavity 391.

A bottom surface 305B of the substrate 301 is formed with the concave portion 301B obtained by the transfer of the convex portion 311 of the mold pin 310. The flat portion 301C is formed at the periphery of the concave portion 301B.

The upper surface 300U of the substrate 301 is formed with a hole 304 obtained by the transfer of the convex portion 361 of the mold pin 360. The bottom of this hole 304 is formed with the convex portion 303D. The flat portion 303E is formed around the hole 304. The optical axes C—C of the convex portion 303D and the concave portion 301B coincide or approximately coincide.

Figure 7:
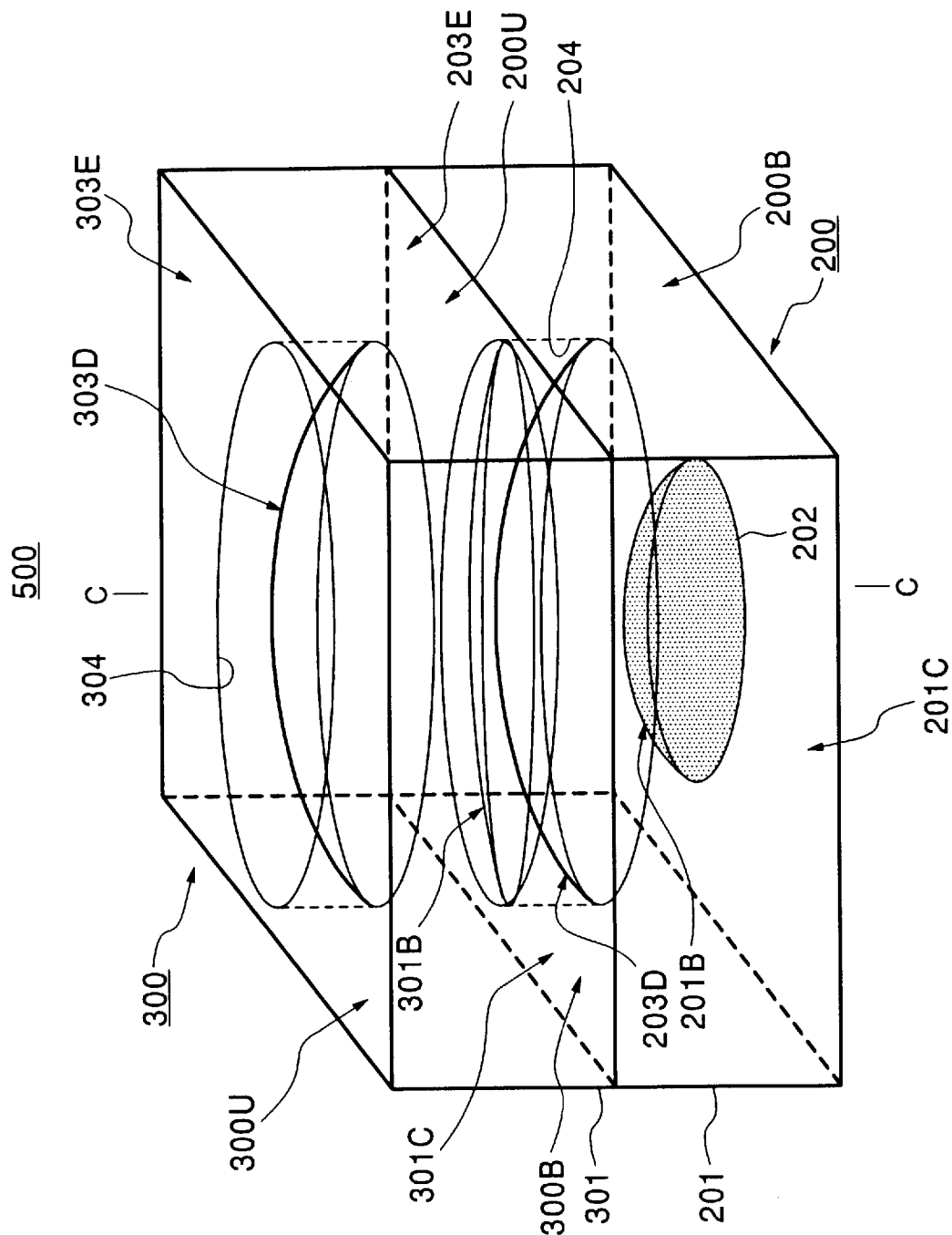
FIG. 7 is a schematic view of the configuration of an optical system obtained by combining optical elements of FIG. 3 and FIG. 5.

FIG. 7 is a schematic view of the configuration of an optical system obtained by combining the optical elements of FIG. 3 and FIG. 5.

This optical system 500 is configured by a stack of the optical elements 200 and 300. The upper surface 200U of the optical element 200 has the bottom surface 300B of the optical element 300 bonded to it.

In the optical system 500, the center axes (optical axes C—C) of the convex portions 303D and 203D and the concave portions 301B and 201B coincide or approximately coincide and become vertical or approximately vertical with respect to the flat portions 303E, 203E, 301C, and 201C.

The longitudinal and lateral dimensions of the substrates 201 and 301 are the same, and the heights become the same or approximately the same.

When a light parallel to the optical axis C—C enters the hole 304 of the optical element 300 of the optical system 500, the light is refracted at the surface of the convex portion 303D in the hole 304 and enters the substrate 301. This incident light passes through the substrate 301, is refracted at the surface of the concave portion 301B, and then is emitted. Next, the light emitted from the concave portion 301B is refracted at the surface of the convex portion 203D in the hole 204 of the optical element 200 and enters the substrate 201. This incident light passes through the substrate 201, is refracted at the surface of the concave portion 201B, and enters the lens 202. This incident light passes through the lens 202, is refracted at the bottom surface of the lens 202, and then is emitted.

In this way, in the optical system 500, the incident light entering the hole 304 of the optical element 300 can be refracted three times in process of being emitted from the lens 202 in the optical element 200, so a high numerical aperture NA can be obtained.

Figure 8:
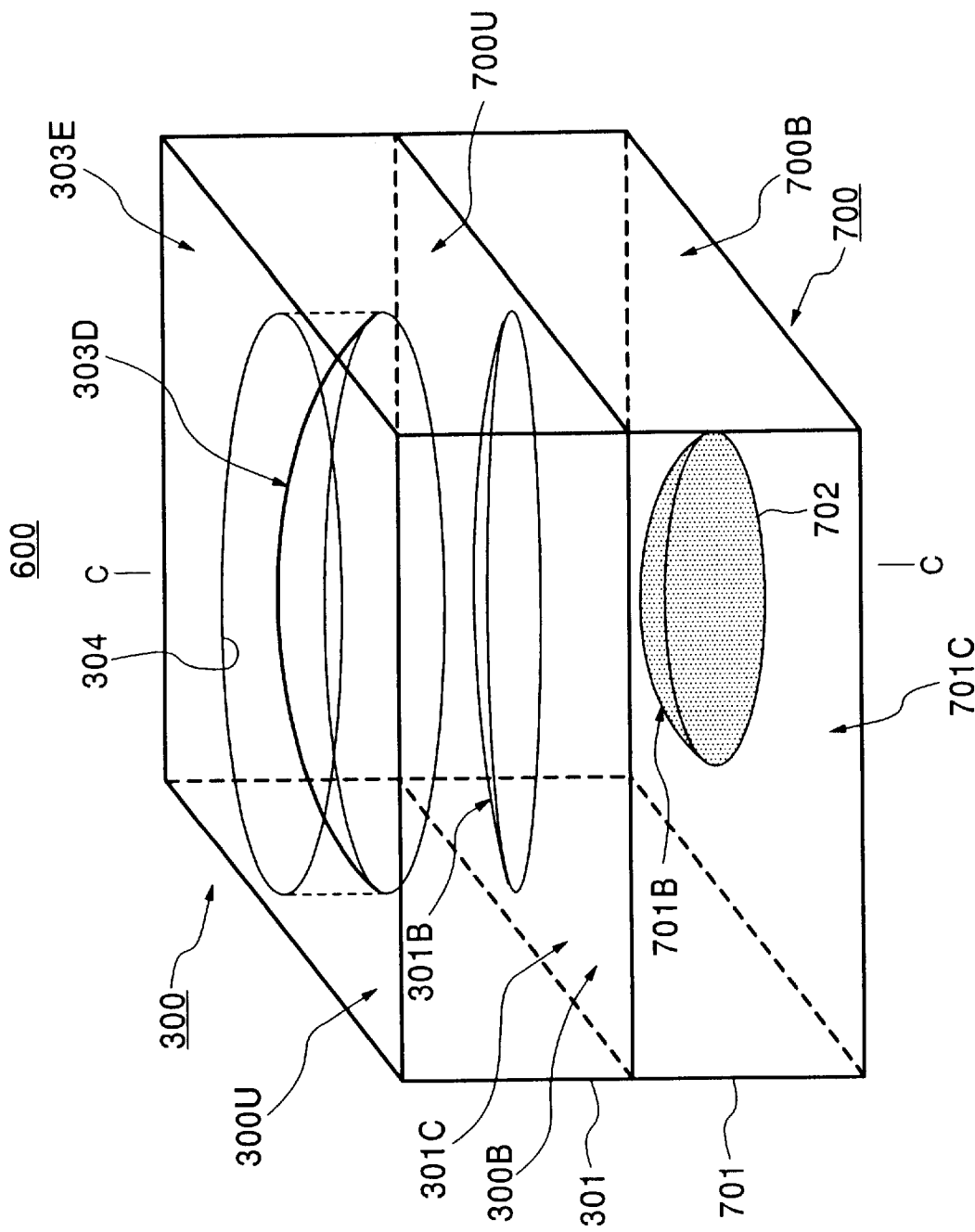
FIG. 8 is a schematic view of the configuration of an optical system using the optical element of FIG. 7.

FIG. 8 is a schematic view of the configuration of an optical system obtained by combining the optical element 300 of FIG. 5 and an optical element 700.

The optical element 700 is shaped as a rectangular parallelopiped or an approximately rectangular parallelopiped having a square or substantially square shape in plan view and having a height smaller than one side of the square. This optical element 700 has a substrate (base) 701 and a lens 702.

The substrate 701 and the lens 702 of the optical element 700 have refractive indexes different from each other and can refract light at the boundary of the substrate 701 and the lens 702.

The substrate 701 has a concave portion 701B axially symmetric or approximately axially symmetric with respect to the optical axis C—C in a bottom surface 700B of the substrate 701. The radius of curvature of the surface of the concave portion 701B is constant or approximately constant. A flat portion 701C is formed around the concave portion 701B. The concave portion 701B is filled with an optical material having a different refractive index from the substrate 701. The lens 702 is formed by the concave portion 701B filled with the optical material. The convex curved surface of the lens 702 is in close contact with the surface of the concave portion 701B.

The bottom surface of the lens 702 is flat or approximately flat and becomes parallel or approximately parallel to the upper surface 700U of the optical element 700. Also, the bottom surface of the lens 702 and the flat portion 701C of the bottom surface 700B of the substrate 701 become parallel or approximately parallel and are positioned on the identical plane in FIG. 8. Nothing is formed on the upper surface 700U. The entire surface is flat.

This combination optical system 600 is configured by stacking the optical elements 300 and 700. An upper surface 700U of the optical element 700 has the bottom surface 300B of the optical element 300 bonded to it.

In the optical system 600, the optical axes C—C of the convex portion 303D and the concave portions 301B and 701B coincide or approximately coincide and become vertical or approximately vertical with respect to the flat portions 303E, 301C, and 701C.

The longitudinal and lateral dimensions of the substrates 701 and 301 are the same, and the heights become the same or approximately same.

When light parallel to the optical axis C—C enters the hole 304 of the optical element 300 of the optical system 600, the light is refracted at the surface of the convex portion 303D in the hole 304 and enters the substrate 301. This incident light passes through the substrate 301, is refracted at the surface of the concave portion 301B, and then is emitted. Next, the light emitted from the concave portion 301B is refracted at the upper surface 700U of the optical element 700 and enters the substrate 701. This incident light passes through the substrate 701, is refracted at the surface of the concave portion 701B, and enters the lens 702. This incident light passes through the lens 702, is refracted at the bottom surface of the lens 702, and then is emitted.

In this way, in the optical system 600, the incident light entering the hole 304 of the optical element 300 can be refracted four times in the process of being emitted from the lens 702 in the optical element 700, so a high numerical aperture NA can be obtained.

Next, an explanation will be made illustrating the method for producing another optical element.

FIGS. 9A to 9I are views of a method for producing a large quantity of combination optical systems illustrated in FIG. 8 with a high efficiency and a high precision.

Figure 9A:
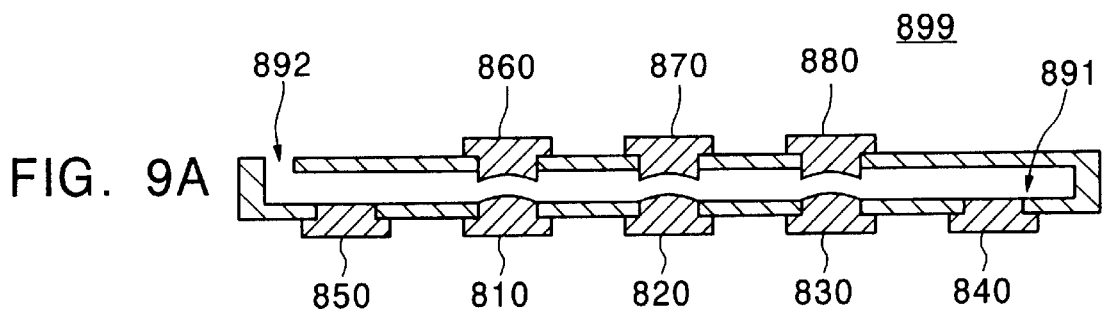
FIGS. 9A to 9I are views of a method for producing a large quantity of combined optical systems illustrated in FIG. 8 with a high efficiency and a high precision.

FIG. 9A is a schematic sectional view of a production use mold 899 used for the production of an optical element 800 having a large number of lenses. This mold 899 is formed with a passage 892 for passing an optical material in the molten state or softened state therethrough and a cavity 891.

Parts of the convex portions of mold pins 810, 820, and 830 project from the bottom surface of the cavity 891 into the cavity 891. The upper flat portions of the mold pins 840 and 850 are exposed in the cavity 891 at the bottom surface of the cavity 891. Parts of the convex portions of the mold pins 860, 870, and 880 project from the upper surface of the cavity 891 into the cavity 891.

The bottom surface in the cavity 891 are flat, the upper surface of the cavity 891 is flat, and the inner bottom surface and the inner upper surface are parallel.

The mold pins 810, 820, and 830 have heads having flat shapes not able to be inserted into the cavity 891 and convex portions projecting from the heads in the vertical direction.

The heads of the mold pins 810, 820, and 830 are in close contact with the outer bottom surface of the mold 899. The convex portions of the mold pins 810, 820, and 830 penetrate through the through holes provided in the bottom wall of the mold 899 and partially project into the cavity 891.

The mold pins 840 and 850 have heads having flat shapes not able to be inserted into the cavity 891 and convex portions projecting from the heads in the vertical direction. The heads of the mold pins 840 and 850 are in close contact with the outer bottom surface of the mold 899. In the convex portions of the mold pins 840 and 850, the top portions (end portions) are flat. The flat end portions penetrate through the through holes provided in the outer bottom wall of the mold 899 and are exposed in the cavity 891. The surfaces of these exposed flat end portions are formed with positioning use marks.

The front ends of the convex portions of mold pins 860, 870, and 880 project from the upper wall of the cavity 891 into the cavity 891.

The front ends of the convex portions of the mold pins 860, 870, and 880 have concave shapes with centers sunken in the form of arcs. The radii of curvature of the surfaces of the center portions are constant or approximately constant.

The mold pins 860, 870, and 880 have heads having flat shapes not able to be inserted into the cavity 891 and convex portions projecting from the heads in the vertical direction. The heads of the mold pins 860 to 880 are in close contact with the outer upper surface of the mold 899. The convex portions of the mold pins 860, 870, and 880 penetrate through the through holes provided in the upper wall of the mold 899.

Figure 9B:
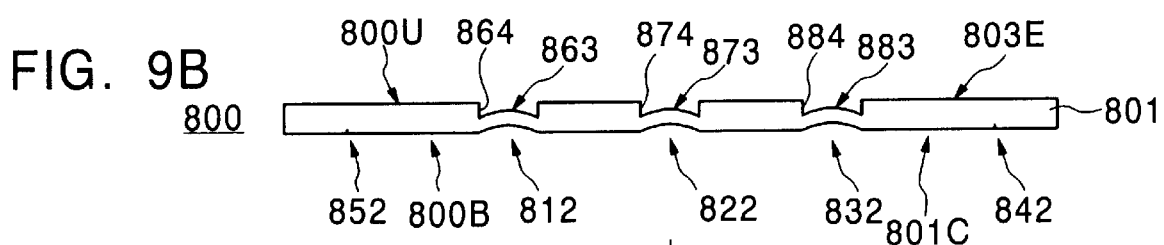
Figure 9C:
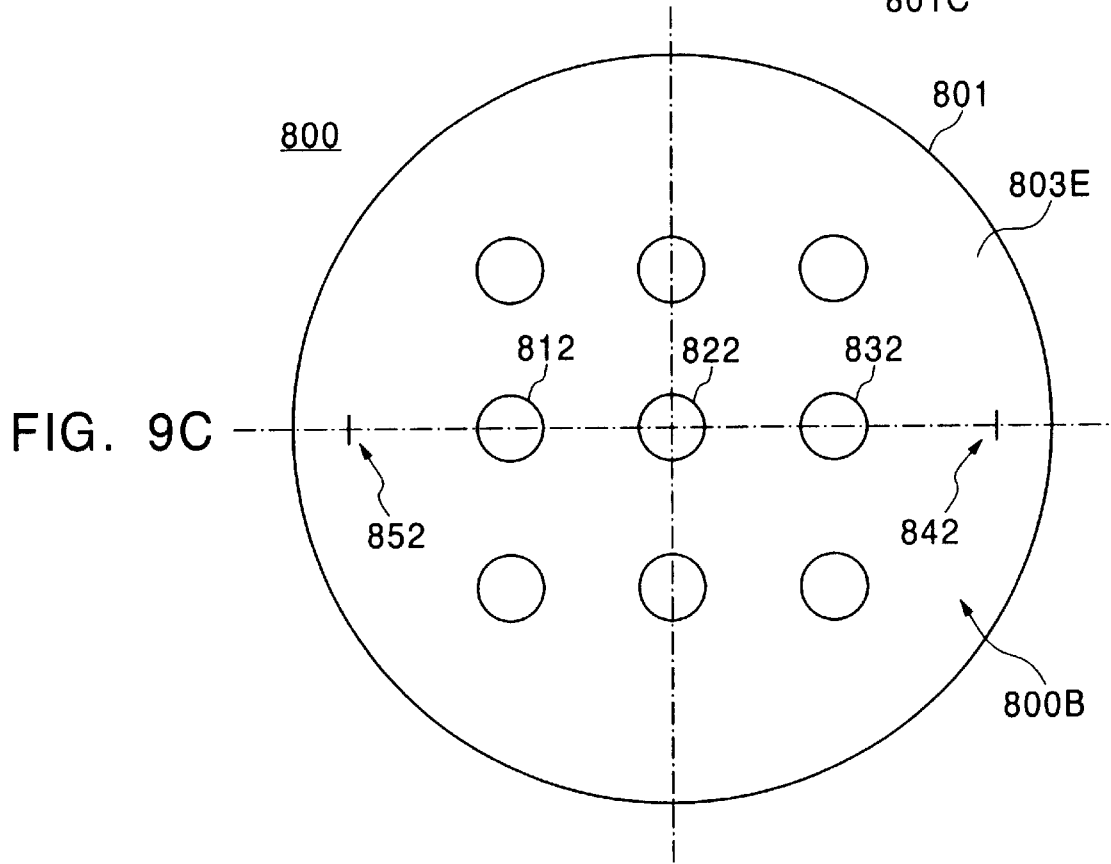

FIGS. 9B and 9C are views of the shaped article produced by the production use mold 899 of the optical element of FIG. 9A. FIG. 9B is a schematic sectional view of the shaped article. FIG. 9C is a schematic bottom view of the shaped article. The cavity 891 of the mold 899 of FIG. 9A is filled with the optical material in the molten state or softened state from a passage 892, this optical material is hardened, the mold 899 is opened, then the shaped article (molded article) is taken out. Then, the portion corresponding to the passage 892 is removed from the shaped article, whereby an optical element 800 made of a substrate 801 as shown in FIGS. 9B and 9C can be obtained. Alternatively, the optical material is filled in the cavity 891, then the portion corresponding to the passage 892 is removed from the filled optical material in the molten state or softened state, the remainder is hardened, the mold 899 is opened, and the shaped article is taken out, whereby the optical element 800 made of the substrate 801 as shown in FIGS. 9B and 9C can be obtained.

Note that, as the optical material to be injected into the cavity 891, use can be made of for example silica-based glass, a plastic synthesis resin, etc. in the molten state or softened state.

A bottom surface 800B of the substrate 801 is formed with concave portions 812, 822, and 832 having shapes of the front ends of the convex portions of the mold pins 860, 870, and 880 transferred thereto. Flat portions 801C are formed around the concave portions 812, 822, and 832. Also, the bottom surface 800B is formed with positioning use marks 842 and 852 obtained by the transfer of the positioning marks of the top portions of the convex portions of the mold pins 840 and 850.

An upper surface 800U of the substrate 801 is formed with holes 864, 874, and 884 obtained by the transfer of the convex portions of the mold pins 860, 870, and 880. Convex portions 863 to 883 are formed on the bottom of the holes 864, 874, and 884. Flat portions 803E are formed around the holes 864, 874, and 884.

The convex portion 863 and concave portion 812, the convex portion 873 and concave portion 822, and the convex portion 883 and concave portion 832 have optical axes which coincide or approximately coincide. The upper surface 800U of the substrate 801 is formed with three rows and three columns of holes to form the convex lenses, while the bottom surface 800B of the substrate 801 is formed with three rows and three columns of concave portions to form the concave lenses.

Figure 9D:
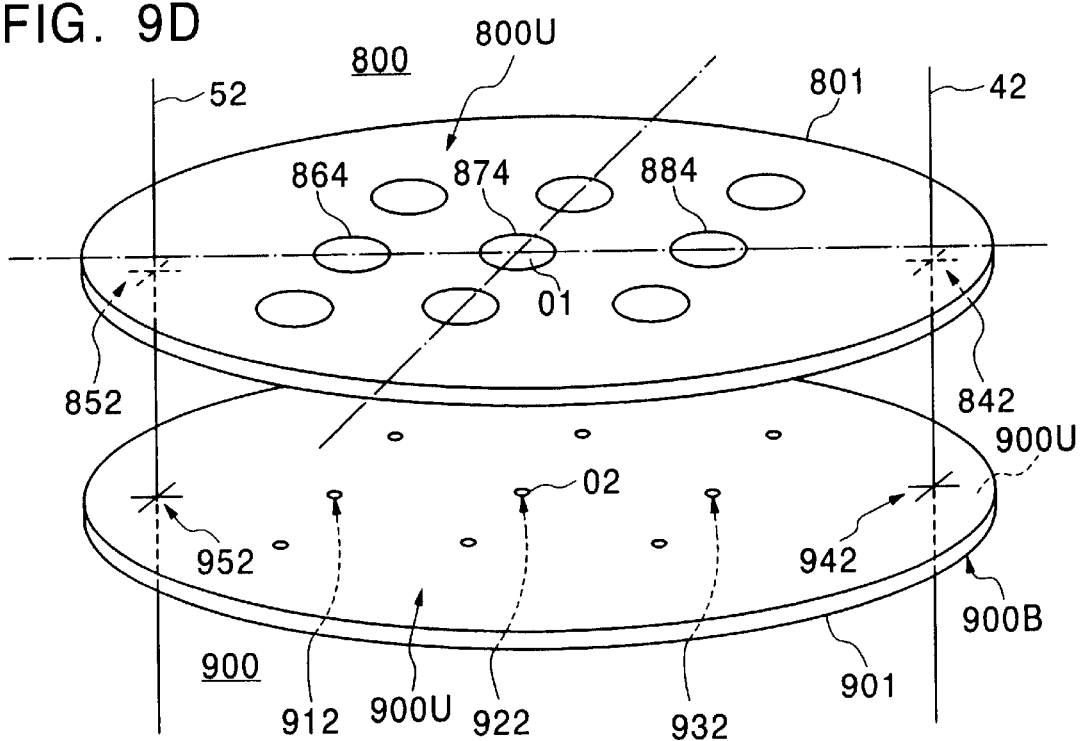
Figure 9E:
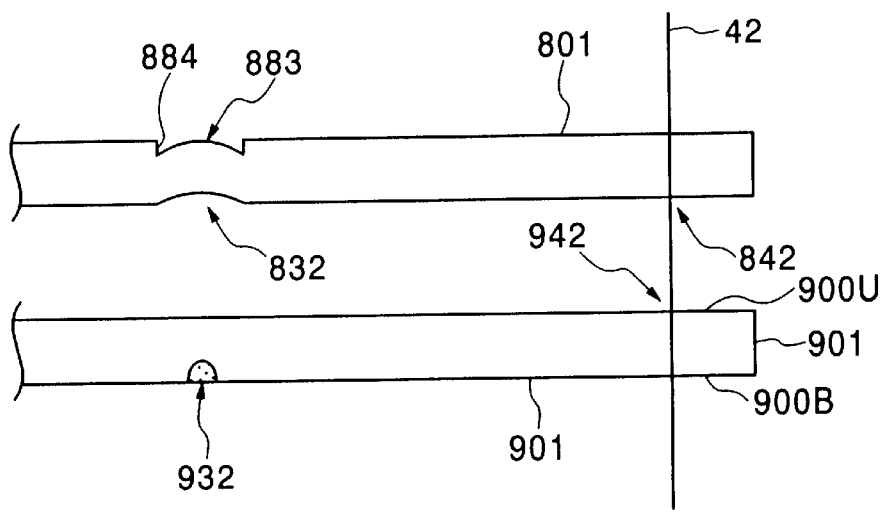

FIGS. 9D and 9E are explanatory views of a situation where the optical element 800 shown in FIGS. 9B and 9C and an optical element 900 formed with 3×3 optical elements 700 illustrated in FIG. 8, having flat upper surfaces, and formed with concave portions in their bottom surfaces and concave portions coinciding with the 3×3 number of lenses of the optical element 800 arranged in parallel, FIG. 9D is a schematic perspective view of the optical elements 800 and 900, and FIG. 9E is a schematic sectional view of the optical elements 800 and 900.

The bottom surface of the disk-like optical element 800 faces an upper surface 900U of the disk-like optical element 900.

The bottom surface 800B of the substrate 901 is formed with concave portions 912, 922, and 932. Flat portions are formed around the concave portions 912, 922, and 932. Also, the upper surface 900U is formed with positioning use marks 942 and 952.

The bottom surface 900B of the substrate 901 is formed with three rows and three columns of concave portions axially symmetric or approximately axially symmetric with respect to the optical axes. The nine holes, in the same way as the lens 702 of the optical element 700 of FIG. 8, are filled with an optical material having a refractive index different from the substrate 901 to form lenses.

The thicknesses of the flat portions at the peripheries of the lenses of the disk-like optical elements 800 and 900 are set to for example about 0.6 mm, and the lens diameters are for example about 0.2 mm to about 1 mm.

The center positions of the nine lenses on the surface of the substrate 801 and the positions of two positioning use marks 842 and 852 and the center positions of the corresponding nine lenses on the surface of the substrate 901 and the positions of two positioning use marks 942 and 952 coincide.

In FIGS. 9D and 9E, the mark 842 of the optical element 800 and the mark 942 of the optical element 900 are arranged positioned on an identical straight line 42, while the mark 852 of the optical element 800 and the mark 952 of the optical element 900 are arranged positioned on an identical straight line 52. Note that a center point 01 between the marks 842 and 852 coincides or approximately coincides with the center of the disk-like substrate 801, while a center point 02 between the marks 942 and 952 coincides or approximately coincides with the center of the disk-like substrate 901.

Figure 9F:
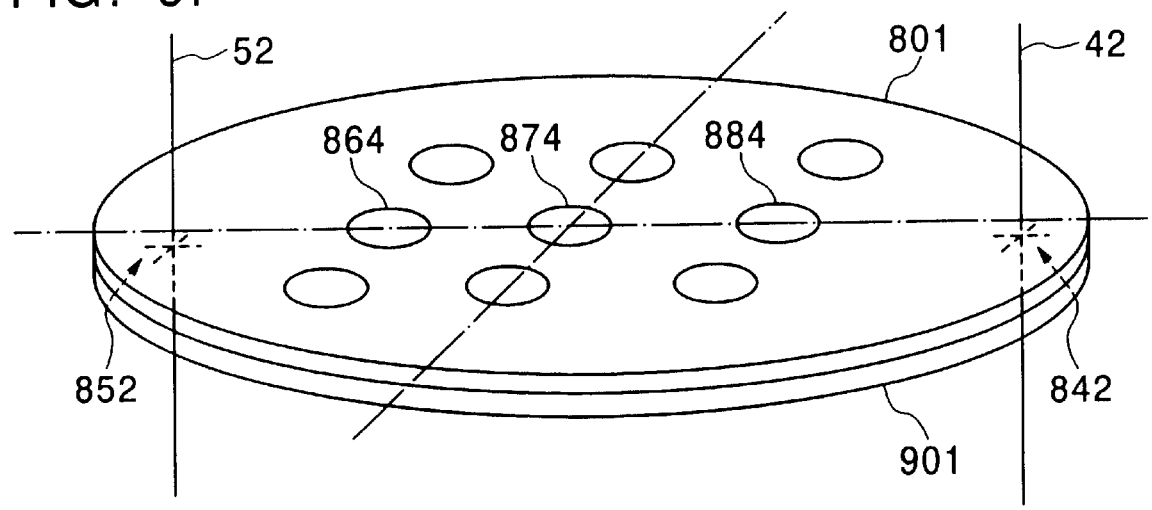
Figure 9G:
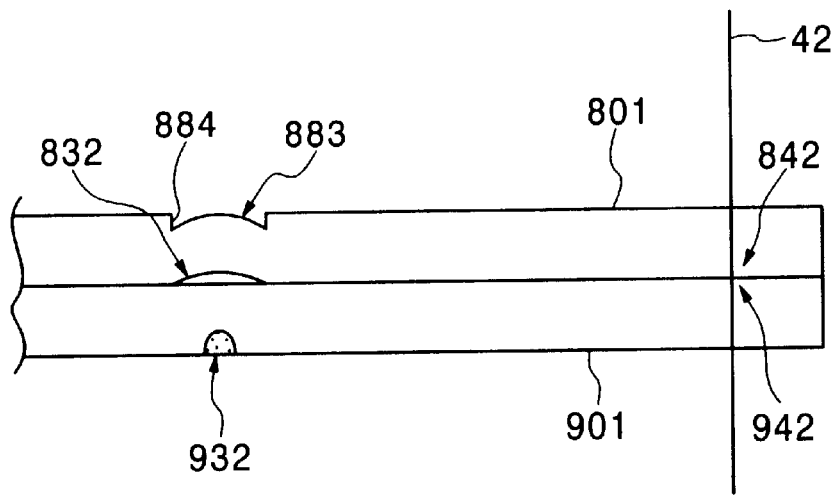

FIGS. 9F and 9G are explanatory views of a situation wherein the optical elements 800 and 900 are stacked on each other, FIG. 9F is a schematic perspective view of the stacked optical elements 800 and 900, and FIG. 9G is a schematic sectional view of the stacked optical elements 800 and 900.

In FIGS. 9F and 9G, the substrates 801 and 901 are bonded so that the mark 842 of the optical element 800 and the mark 942 of the optical element 900 are superimposed and so that the mark 852 of the of the optical element 800 and the mark 952 of the optical element 900 are superimposed. In this way, by printing the marks on the opposing surfaces, the precision of the positioning of the optical elements 800 and 900 can be improved.

Figure 9H:
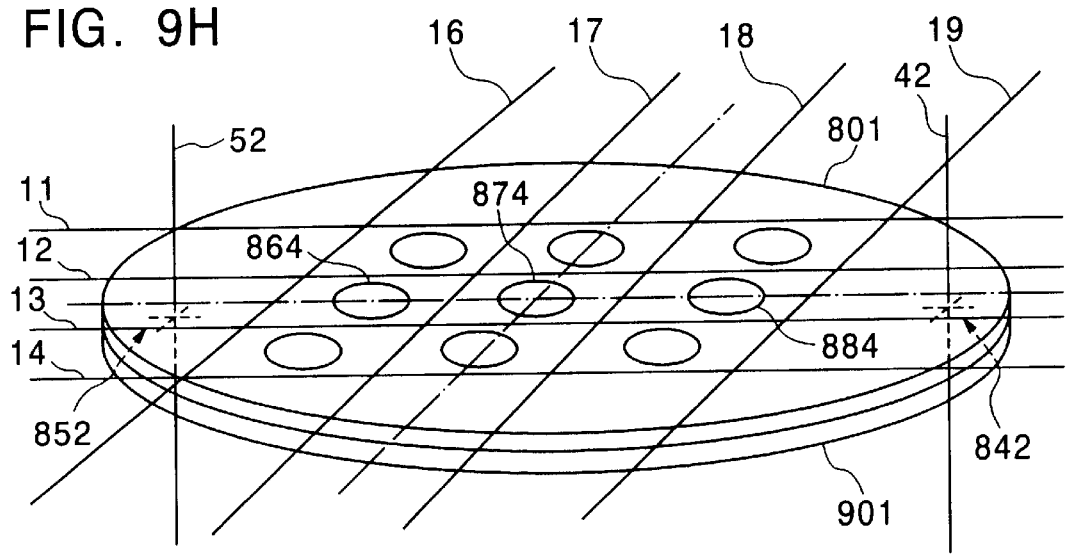
Figure 9I:
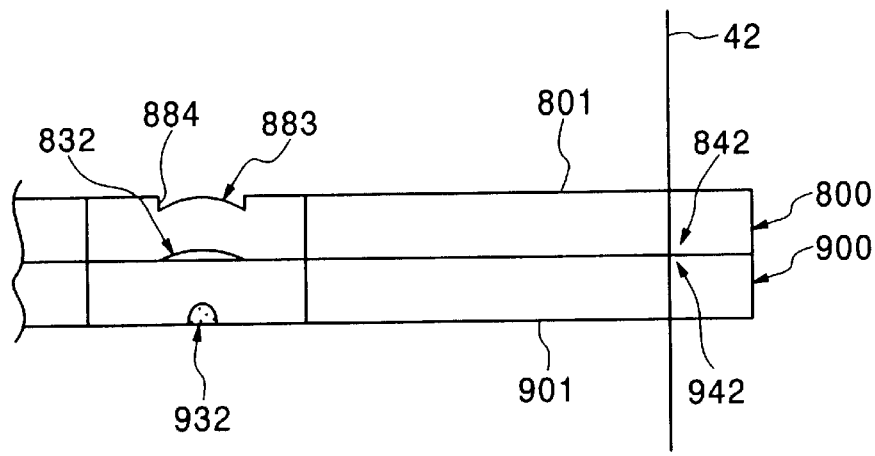

FIGS. 9H and 9I are explanatory views of cutting lines for cutting the bonded optical elements 800 and 900. FIG. 9H is a schematic perspective view of the bonded optical elements 800 and 900 and the cutting lines, while FIG. 9I is a schematic sectional view of bonded optical elements 800 and 900 and the cutting lines.

By cutting the bonded optical elements 800 and 900 along the cutting lines 11 to 14 in the lateral direction and cutting lines 16 to 19 in the longitudinal direction so as to separate them into individual optical systems having lenses formed on the substrate 801 and having lenses formed on the substrate 901, it is possible to obtain optical systems having the same or approximately same shape as the optical system 600 of FIG. 8. By cutting the optical elements along the cutting lines 11 to 14 and 16 to 19 in this way, a plurality of (nine) optical systems as illustrated in FIG. 8 where the optical axes coincide and there is almost no inclination of the stacked lenses can be obtained from the bonded optical elements 800 and 900. This is suited to mass production of the optical systems.

Note that the mold 899 of FIG. 9A may also be configured with the positioning marks formed on the bottom surface of the cavity 891 in place of the pins 840 and 850 and the marks transferred to the bottom surface 800B of the substrate 801.

The optical material to be injected into the cavities 191 to 491 and 891 of the molds 199 to 499 and 899 is silica-based glass or plastic resin. It is also possible to use for example tantalum oxide, niobium oxide, titanium oxide, gallium phosphate (gallium phosphorus), gallium nitride, or a compound of tantalum, titanium, and oxygen as the optical material of the lens portion for raising the refractive index.

Figure 10A:
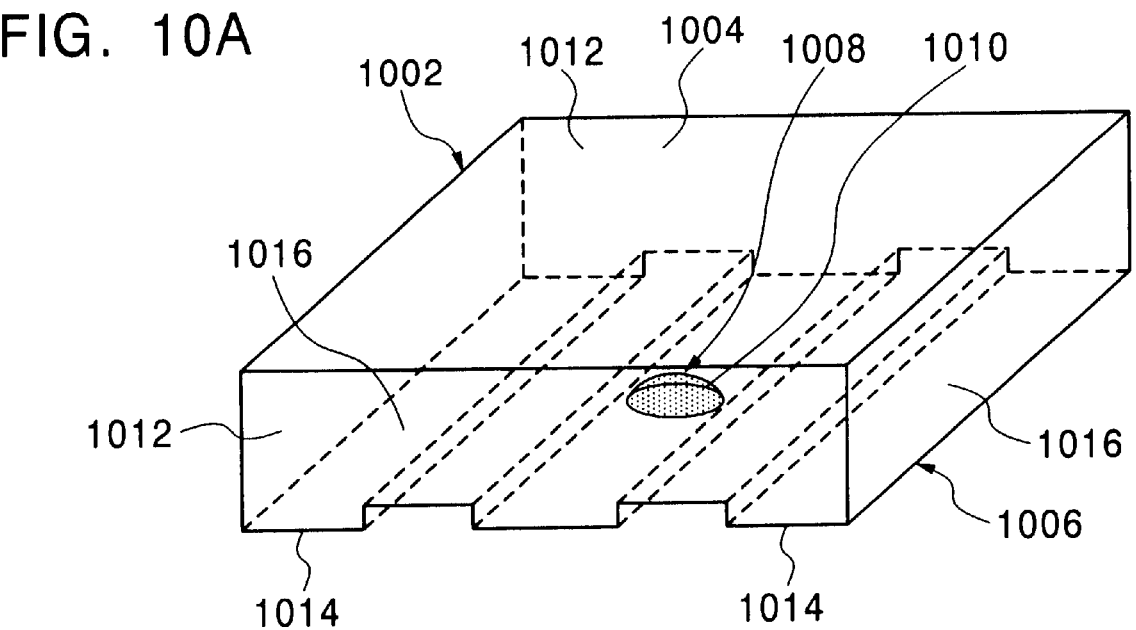
FIG. 10A is a perspective view of an example of the optical element according to the present invention.
Figure 10B:
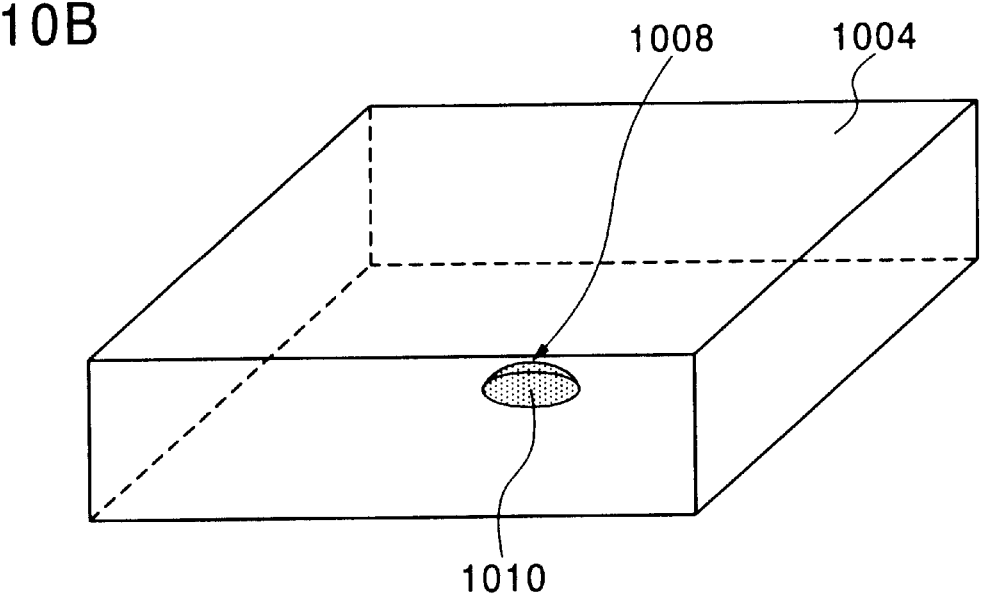
FIG. 10B is a perspective view of a glass plate having a lens for preparing the optical element of FIG. 10A.

FIG. 10A is a perspective view of a fourth embodiment of the optical element according to the present invention, and FIG. 10B is a perspective view of a glass plate having a lens for producing the optical element of FIG. 10A. Also, FIGS. 11A to 11D are sectional side views of the steps when producing the optical element of FIG. 10A.

An optical element 1002 of the fourth embodiment, as shown in FIG. 10B, is comprised by a transparent member having a rectangular shape when seen from a plan view, for example, a glass substrate 1004 (corresponding to the substrate made of the optical material according to the present invention). A concave portion 1008 is formed at the center of one surface 1006 of the glass substrate 1004. This concave portion 1008 is filled with a transparent material having a refractive index different from that of the glass substrate 1004, whereby a lens 1010 is formed.

As shown in FIG. 10A, the surface 1006 of the glass substrate 1004 is formed with two floating use rails 1014 and 1014 sandwiching the lens 1010 and extending parallel between opposing end surfaces 1012 of the glass substrate 1004 integrally with the glass substrate 1004.

When recording or reproducing data using the optical element 1002 as a floating type optical head, a state is exhibited where the surface 1006 of the glass substrate 1004 faces the surface of a high speed rotating disk-like data recording medium and the direction of extension of the floating use rails 1014 coincides with a track tangential direction of the data recording medium by for example supporting the optical element 1002 on for example a slider and where the optical element 1002 floats above the data recording medium via a thin layer of air formed between upper surfaces 1016 of the floating use rails 1014 and the surface of the rotating data recording medium.

Such an optical element 1002 can be formed by using for example a mold. Namely, a simple plate-shaped glass substrate is usually formed by the mold, so the structure shown in FIG. 10A can be easily obtained by just forming structures corresponding to the floating use rails 1014 or the like in the mold.

Further, it is possible to produce the optical element 1002 by the process shown in FIGS. 11A to 11D.

Figure 11A:
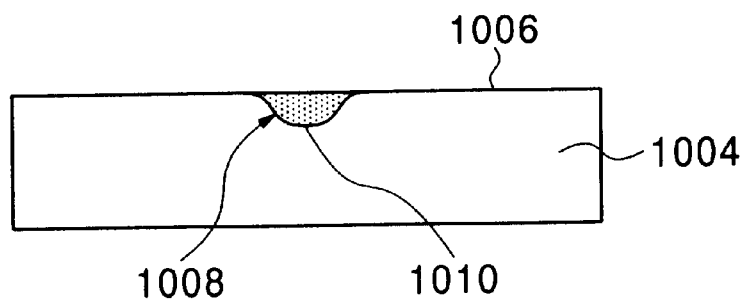
FIGS. 11A to 11D are sectional side views of steps when preparing the optical element of FIG. 10A.
Figure 11B:
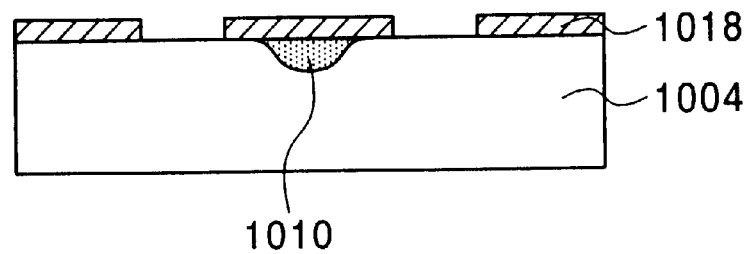

As shown in FIG. 11A, a transparent glass substrate 1004 obtained by forming a concave portion 1008 in the glass substrate 1004, then filling the concave portion 1008 of one surface 1006 with an optical material having a higher refractive index than the refractive index of the glass substrate 1004, for example, niobium oxide, is prepared, the entire surface of the lens 1010 side of that glass plate is formed with a photoresist film 1018, and the photoresist film 1018 is removed while leaving the areas of the lens 1010 and the two strip-like rails 1014 and 1014 extending in parallel as shown in FIG. 11B by photolithography.

Figure 11C:
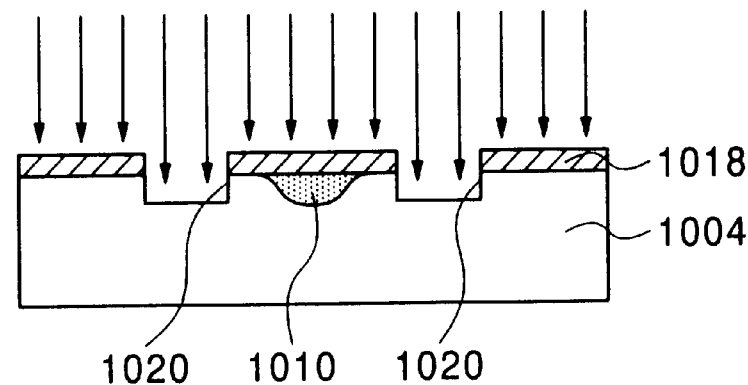

Next, as shown in FIG. 11C, the surface 1006 of the glass substrate 1004 is dry etched using the remaining photoresist film 1018 as a mask to form the two grooves 1020.

Figure 11D:
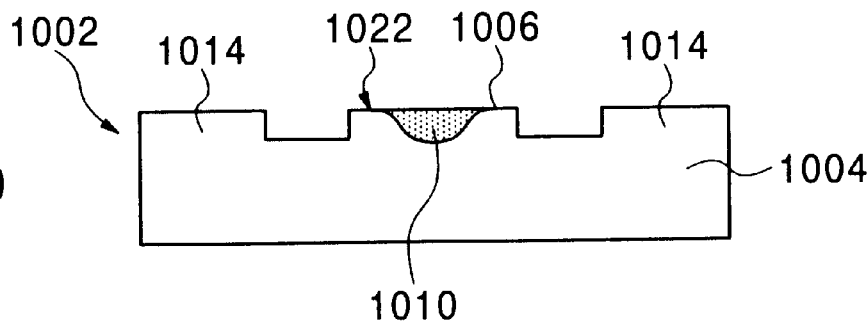

Thereafter, as shown in FIG. 11D, the photoresist film 1018 is removed to obtain the optical element 1002 using the two side portions outside from the above two grooves 1020 at the surface 1006 of the glass substrate 1004 as the two floating use rails 1014.

In this way, the optical element 1002 of the fourth embodiment is simply structured by the glass substrate 1004 provided with the lens 1010 formed integrally with the two floating use rails 1014, therefore it is not necessary to form a ball holding hole with a high precision as in the conventional case mentioned by referring to FIG. 19A to FIG. 19E or to prepare a lens having a high sphericity and perform precise attachment work of the lens having a hard to handle shape. Also, there is no problem of the fine processing of the lens or problem of the positioning of the lens.

Accordingly, the production of the optical element 1002 is easy, time is not taken, and costs can be reduced. Further, the lens does not project upward as in the conventional case, which is advantageous to the reduction of size. It also becomes possible to realize an ultra-small sized data storage device by configuring the floating type optical head by such an optical element 1002.

Further, the lens 1010 is formed in close contact with the glass substrate 1004, so is stronger in comparison with the conventional structure where the lens is bonded to the substrate. Even if shock is applied to the optical element 1002, it does not easily break.

The lens formed on the glass substrate or the like has the features that the entire element can be formed by a plate-shaped lens, formation of an aspherical lens is possible, a lens of a high numerical aperture (NA) can be formed, and a miniature lens can be formed. In the present embodiment, by utilizing such a lens effectively, an optical element 1002 exhibiting the above effects is realized.

Note that, in the present embodiment, as shown in FIG. 11D etc., a surface 1022 of the portion for forming the lens at the center of the glass substrate is the same in height as the upper surfaces of the floating use rails 1014, but the surface 1022 can be lower than the upper surfaces of the floating use rails 1014 too. In this case as well, the optical element 1002 stably floats above the data recording medium by the floating use rails 1014. Note that when it is required to arrange the lens 1010 close to the surface of the data recording medium as much as possible, the element is desirably formed so that the height of the surface 1022 is as high as possible within a range not exceeding the upper surfaces of the floating use rails 1014.

Next, an explanation will be made of fifth to eighth embodiments of the present invention. FIGS. 12A to 12D are sectional side views of the fifth to eighth embodiments of the present invention. In the figures, the same reference numerals are assigned to elements the same as those of FIGS. 10A to 10B and FIGS. 12A to 12D.

First, an explanation will be made of the fifth embodiment.

Figure 12A:
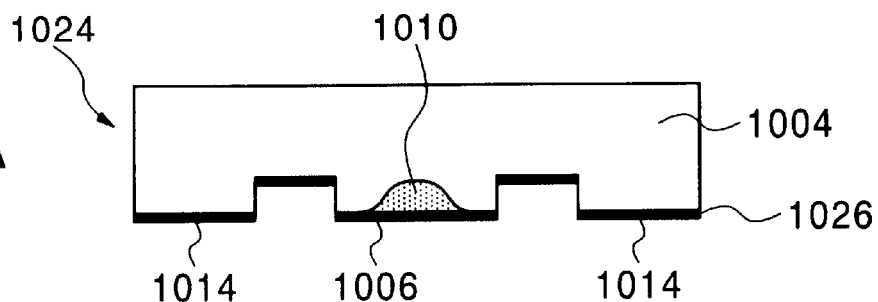
FIGS. 12A to 12D are sectional side views of optical elements of fifth to eighth embodiments of the present invention.

The optical element 1024 of the fifth embodiment shown in FIG. 12A differs from the optical element 1002 of the fourth embodiment in the point that the surface 1006 of the glass substrate 1004 is coated by a protective film 1026 made of a transparent material having a higher hardness than the glass substrate 1004 and containing carbon as a principal component.

The protective film 1026 can be formed by depositing a transparent material on the surface 1006 of the glass substrate 1004 by utilizing for example sputtering or other vacuum thin film deposition.

Very rarely, but possibly, the floating state cannot be maintained due to shock or the like and the optical element collides with the surface of the data recording medium and breaks. In such a case, since the protective film 1026 is formed on the upper surfaces of the floating use rails 1014 or the like in the optical element 1024, breakage can be avoided. Further, at the start of rotation or at the end of rotation of the data recording medium, the optical element does not float and the state where the upper surfaces of the floating use rails 1014 slide on the surface of the data recording medium is exhibited, so by forming the protective film 1026 as in the optical element 1024, wear of the floating use rails 1014 can be suppressed.

Next, an explanation will be made of the sixth embodiment.

Figure 12B:
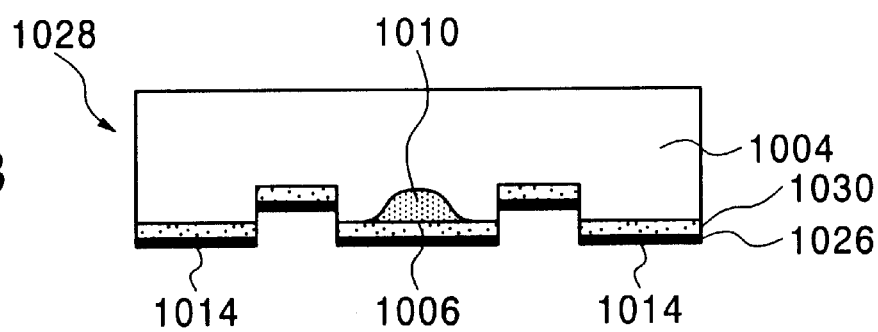

An optical element 1028 of the sixth embodiment shown in FIG. 12B differs from the optical element 1024 of the fifth embodiment in the point that the surface 1006 of the glass substrate 1004 is formed with a protective film 1030 made of a transparent material having a higher hardness than the glass substrate 1004 but having a lower hardness than the protective film 1026 and formed on that with a protective film 1026.

The protective film 1030, in the same way as the protective film 1026, can be formed by depositing the material of the protective film 1030 on the surface 1006 of the glass substrate 1004 by utilizing sputtering or other vacuum thin film deposition.

In the structure of the optical element 1028, when the protective film 1026 cannot be formed too thick, it is possible to form a protective film 1030 having a sufficient thickness by a material slightly poor in terms of the hardness, but able to form a thick film and possible to more effectively avoid breakage due to the collision with the data recording medium.

Next, an explanation will be made of the seventh embodiment.

Figure 12C:
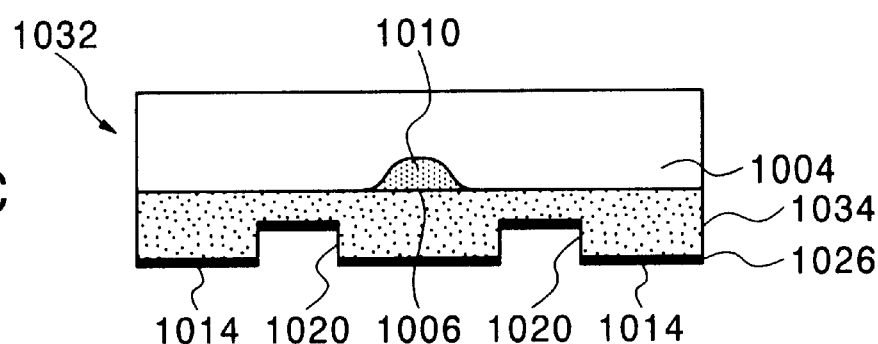

An optical element 1032 of the seventh embodiment, as shown in FIG. 12C, is configured by a glass substrate 1004 (first substrate according to the present invention) on the surface 1006 of the lens 1010 side of which is thickly deposited a transparent layer 1034 made of a transparent material having a higher hardness than the glass substrate 1004 (second substrate according to the present invention). The transparent layer 1034, as will be explained in detail later, can be formed by depositing for example the transparent material on the glass substrate 1004 by film formation.

Then, the surface of the transparent layer 1034 on the side opposite to the glass substrate 1004 is integrally formed with two floating use rails 1014 sandwiching the lens 1010 when seen from a plan view and extending parallel between the opposing end surfaces of the transparent layer 1034. Further, the surface of the transparent layer 1034 on the side of the floating use rails 1014 is coated with a transparent protective film 1026 having a higher hardness than the transparent layer 1034 and containing carbon as a principal component.

In this structure, the grooves 1020 are formed not in the glass substrate 1004, but in the transparent layer 1034, and the transparent layer 1034 is thick enough to form the grooves 1020. Accordingly, in the optical element 1032, breakage due to collision with the data recording medium can be avoided more effectively than with the optical element 1028.

Next, an explanation will be made of the eighth embodiment.

Figure 12D:
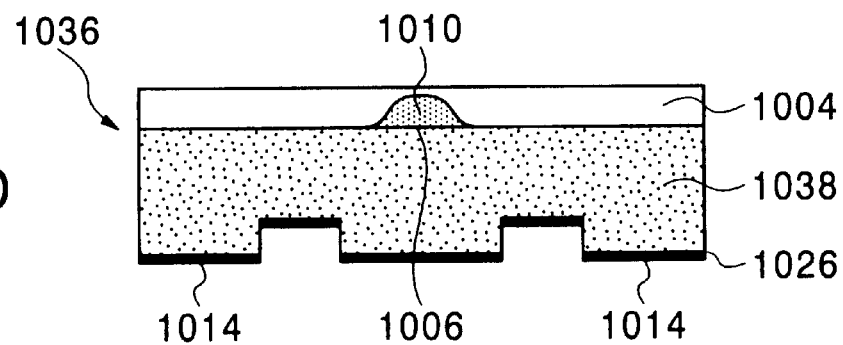

An optical element 1036 of the eighth embodiment shown in FIG. 12D differs from the optical element 1032 in the point that a transparent substrate 1036 (second substrate according to the present invention) is used in place of the transparent layer 1034. The transparent substrate 1038 is formed by a transparent material having a higher hardness than the glass substrate 1004 and is arranged with its surface facing the surface 1006 of the glass substrate 1004 and in close contact with the glass substrate 1004.

The surface of the transparent substrate 1038 on the side opposite to the glass substrate 1004 is integrally formed with two floating use rails 1014 sandwiching the lens 1010 when seen from a plan view and extending in parallel between the opposing end surfaces of the transparent substrate 1038. Further, the surface of the transparent substrate 1038 at the side of the floating use rails 1014 is coated by a transparent protective film 1026 having a higher hardness than the transparent substrate 1038 and containing carbon as a principal component.

In the structure of this optical element 1036, it is possible to use a substrate having a sufficient thickness as the transparent substrate 1038. Accordingly, when configuring the floating type optical head by the optical element 1036, breakage due to collision with the data recording medium can be more effectively avoided.

Note that, by using a glass substrate thinner than the glass substrate 1004 of the optical element 1002 as the glass substrate 1004 of the optical element 1036, the thickness of the optical element 1036 as a whole can be suppressed.

Note that, the protective film 1026 to be coated on the surface of the floating use rail side of the optical element shown in FIGS. 12A to 12D can be concretely formed by diamond-like carbon. By setting the thickness thereof to for example at least 5 nm, a sufficient effect is obtained for avoiding breakage of the floating type optical head.

Further, the protective film 1026, transparent layer 1034, and transparent substrate 1038 constituting the sixth to eighth embodiments shown in FIGS. 12B to 12D can be formed by for example alumina, silica-based glass, silicon nitride, etc.

Then, the dry etching for forming the grooves 1020 in the glass substrate 1004, transparent layer 1034, and transparent substrate 1038 can be performed by ion milling by for example argon ions.

Next, an explanation will be made of the method for producing an optical element 1032 of the seventh embodiment shown in FIG. 12C. FIGS. 13A to 13E are sectional side views of a production process of the optical element 1032 of the seventh embodiment.

Figure 13A:
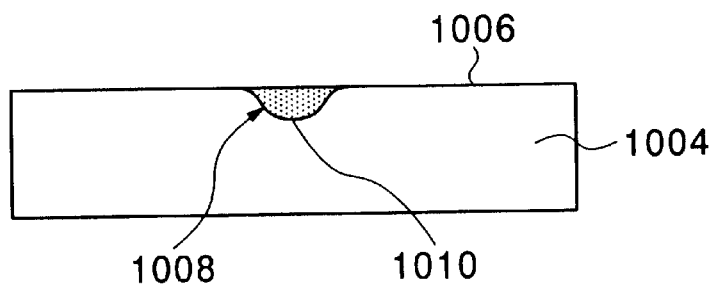
FIGS. 13A to 13E are sectional side views of a process of fabrication of the optical element of the seventh embodiment.
Figure 13B:
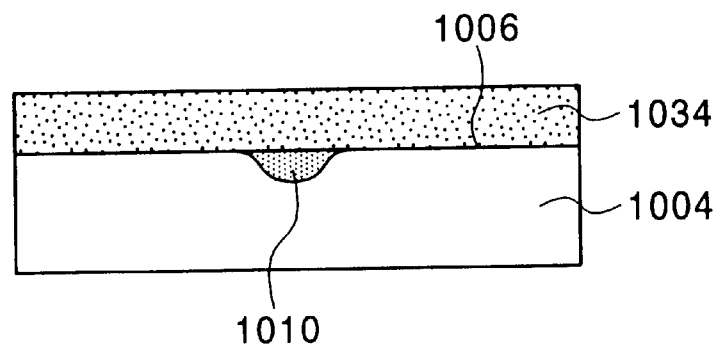

As shown in FIG. 13A, a transparent glass substrate 1004 having the lens 1010 obtained by forming the concave portion 1008 in one surface 1006 of the glass substrate 1004, then filling the concave portion 1008 with for example an optical material having a higher refractive index than the refractive index of the substrate 1004 is prepared, the surface 1006 of the glass substrate 1004 at the side of the lens 1010, as shown in FIG. 13B, is deposited with a transparent material having a higher hardness than the glass substrate 1004 by for example sputtering to obtain a transparent layer 1034 in close contact with the glass substrate 1004.

Figure 13C:
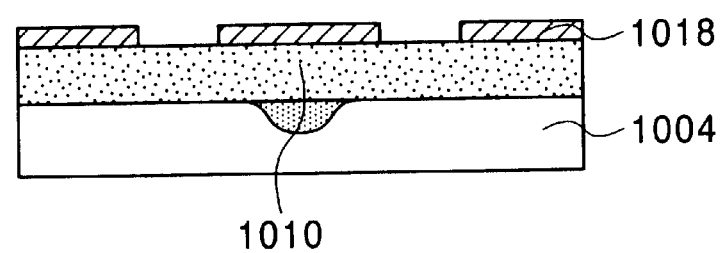

As shown in FIG. 13C, the surface of the transparent layer 1034 at the side opposite to the glass substrate 1004 is formed with a photoresist film 1018, and the photoresist film 1018 is removed in the regions of the lens 1010 and two strip-shaped rails 1014 extending parallel when seen from a plan view by photolithography.

Figure 13D:
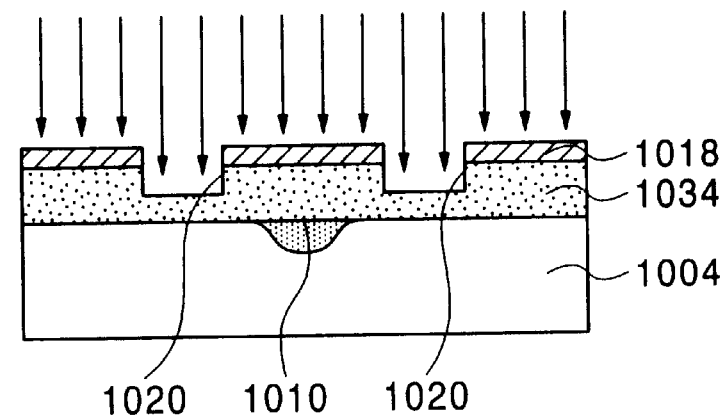
Figure 13E:
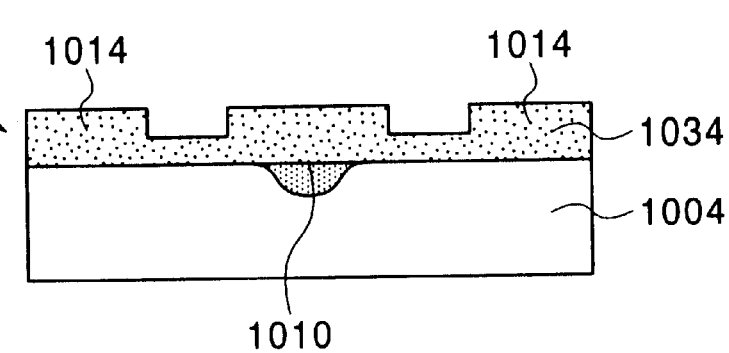

As shown in FIG. 13D, the surface of the transparent layer 1034 is dry etched using the remaining photoresist film 1018 as a mask to form two grooves 1020 in the surface of the transparent layer 1034, then, as shown in FIG. 13E, the photoresist film 1018 is removed to obtain an optical element 1032 using the two side portions outside from the above two grooves 1020 at the surface of the transparent layer 1034 as the two floating use rails 1014.

Next, an explanation will be made of the method for producing an optical element 1036 of the eighth embodiment shown in FIG. 12D. FIGS. 14A to 14E are sectional side views of the process of production of the optical element 1036 of the eighth embodiment, and FIGS. 15A to 15D are sectional side views of another process of production of the optical element of the eighth embodiment.

The optical element 1036 shown in FIG. 12D is formed by bonding with the transparent glass substrate 1004 rectangular seen from the plan view having a lens 1010 obtained by filling the concave portion 1008 of one surface 1006 with the transparent material the transparent substrate 1038 rectangular seen from the plan view made of a transparent material having a higher hardness than the glass substrate 1004 with the surface facing the surface 1006 of the glass substrate 1004 at the lens 1010 side.

The floating use rails 1014 to be formed on the transparent substrate 1038 can be formed on the transparent substrate 1038 after bonding the transparent substrate 1038 to the glass substrate 1004 or can be formed on the transparent substrate 1038 before bonding the transparent substrate 1038 to the glass substrate 1004.

Figure 14A:
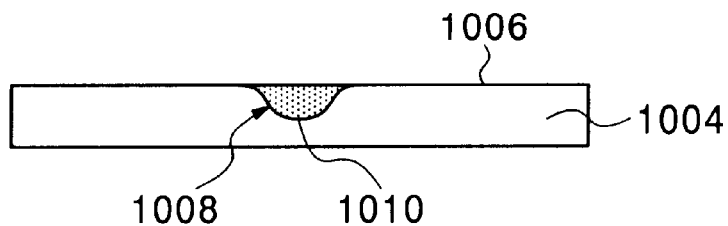
FIGS. 14A to 14E are sectional side views of a process of fabrication of the optical element of the eighth embodiment.
Figure 14B:
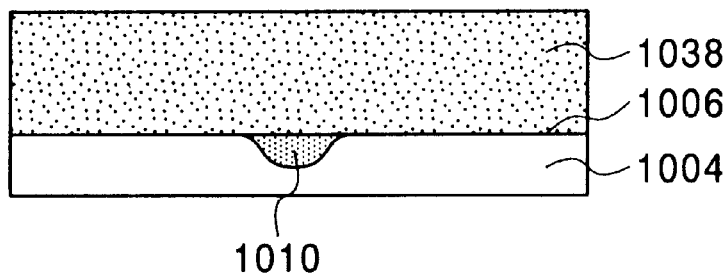

When forming the floating use rails 1014 after the bonding, as shown in FIG. 14A, a glass substrate 1004 having a lens 1010 obtained by filling the concave portion 1008 of one surface 1006 with a transparent material is prepared. The surface 6 of the glass substrate 1004 at the lens 1010 side, as shown in FIG. 14B, has a transparent substrate 1038 made of a transparent material having a higher hardness than the glass substrate 1004 brought into close contact and bonded with it with the surfaces facing each other.

Figure 14C:
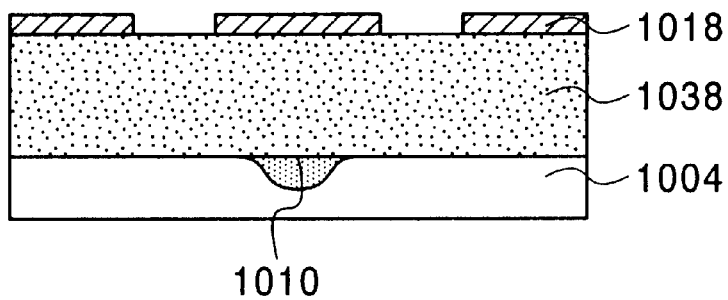

Next, as shown in FIG. 14C, the surface of the transparent substrate 1038 at the opposite side to the glass substrate 1004 is formed with a photoresist film 1018, and the photoresist film 1018 is removed by photolithography in two strip-shaped regions sandwiching the lens 1010 when seen from a plan view and extending in parallel.

Figure 14D:
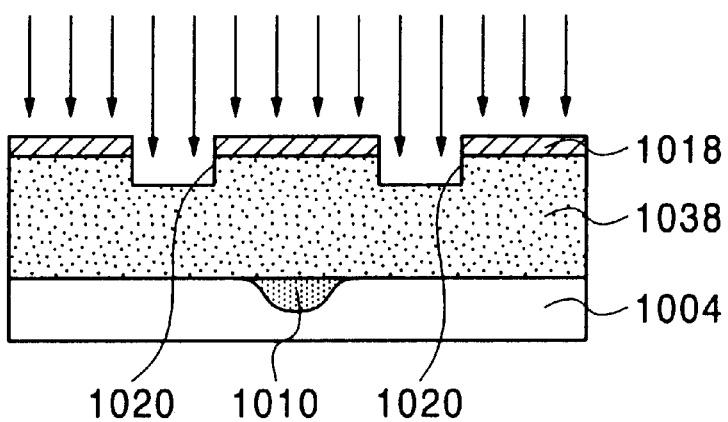
Figure 14E:
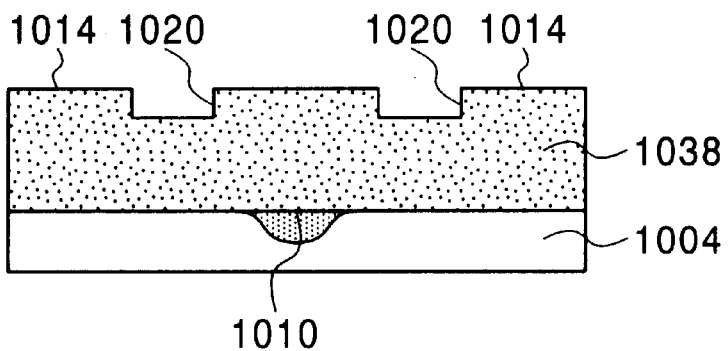

Then, as shown in FIG. 14D, the surface of the transparent substrate 1038 is dry etched using the remaining photoresist film 1018 as a mask to form two grooves 1020 in the surface of the transparent substrate 1038, then, as shown in FIG. 14E, the photoresist film 1018 is removed to obtain the optical element using the two side portions outside from the above two grooves 1020 in the surface of the transparent substrate 1038 as the two floating use rails 1014. Further, as shown in FIG. 12D, the surface of the transparent substrate 1038 is coated with a protective film 1026, whereby the optical element 1036 is completed.

Figure 15A:
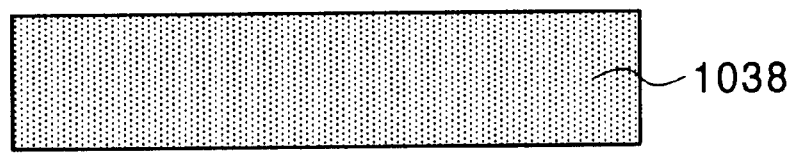
FIGS. 15A to 15D are sectional side views of another process of fabrication of the optical element of the eighth embodiment.
Figure 15B:
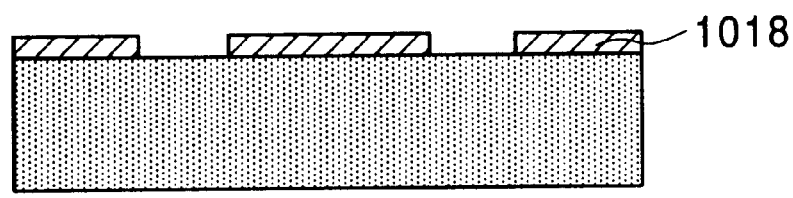

On the other hand, when forming the floating use rails 1014 before bonding the glass substrate 1004 and the transparent substrate 1038, as shown in FIG. 15A, a transparent substrate 1038 made of a material having a higher hardness than the glass substrate 1004 is prepared, one surface thereof is formed with a photoresist film 1018 as shown in FIG. 15B, and the photoresist film 1018 is removed in two strip-shaped regions sandwiching the lens 1010 when seen from a plan view when then bonding the glass substrate 1004 by photolithography and extending in parallel between opposing end surfaces of the transparent substrate 1038.

Figure 15C:
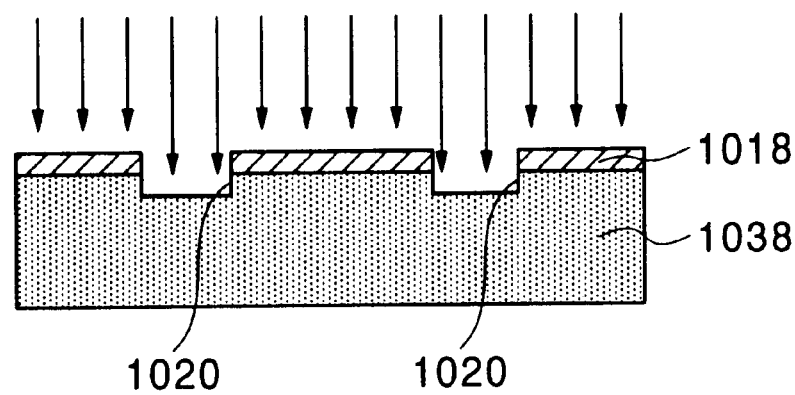
Figure 15D:
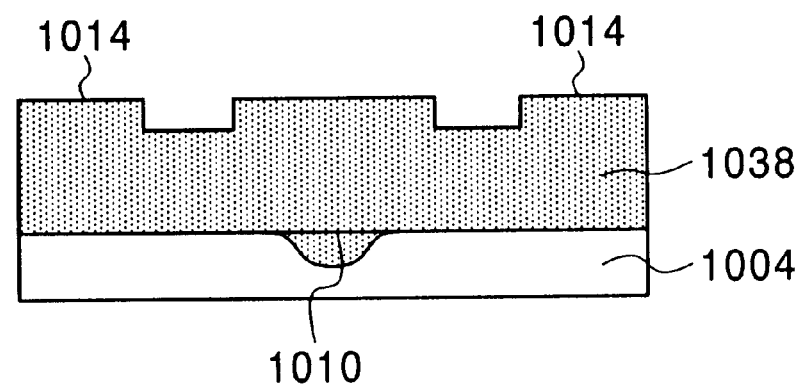

Then, as shown in FIG. 15C, the surface of the transparent substrate 1038 is dry etched using the remaining photoresist film 1018 as a mask to form two grooves 1020 in the surface of the transparent substrate 1038, then, as shown in FIG. 15D, the photoresist film 1018 is removed and the glass substrate 1004 having the lens 1010 is brought in close contact and bonded with the surface of the transparent substrate 1038 at the side opposite to the floating use rails 1014 to obtain the optical element. Then, as shown in FIG. 12D, the surface of the transparent substrate 1038 is coated with a protective film 1026, whereby the optical element 1036 is completed.

Next, an explanation will be made of the ninth embodiment.

Figure 16:
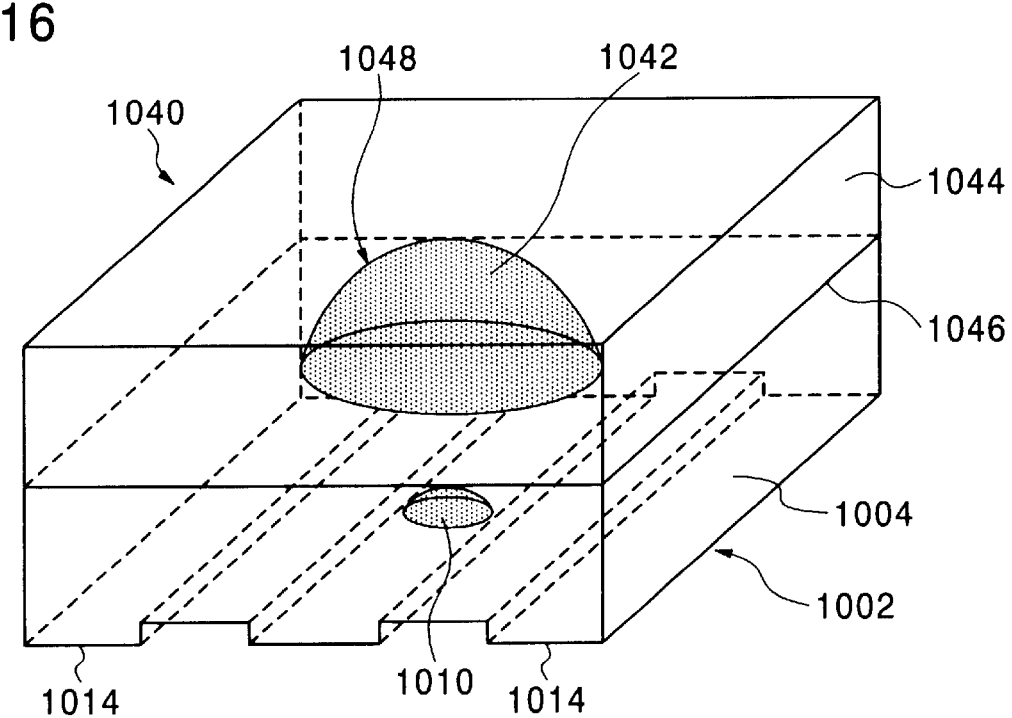
FIG. 16 is a perspective view of a ninth embodiment of the present invention.

FIG. 16 is a perspective view of the ninth embodiment of the present invention. In the figure, the same reference numerals are assigned to the same elements as those of FIGS. 10A to 10B.

An optical element 1040 of the ninth embodiment, as shown in FIG. 16, is configured by bonding a glass substrate 1044 having a lens 1042 with the optical element 1002. Namely, the center of one surface 1046 of the glass substrate 1044 rectangular when seen from a plan view is formed with a concave portion 1048. The concave portion 1048 is filled with a transparent material having a refractive index different from that of the glass substrate 1044, whereby the lens 1042 is formed. Then, the glass substrate 1044 is brought into close contact and bonded with the surface of the glass substrate 1004 at the side opposite to the lens 1010 to face the surface on the lens 1042 side.

By combining two lenses 1010 and 1042 in this way, a solid immersion lens is constituted. By configuring the floating type optical head by this optical element 1040, the laser beam focused to the surface of the data recording media can be further converged, so this is effective for raising the data recording density. Further, the structure is simple irrespective of the usage of two lenses, so can be easily produced and enables realization of a small sized optical element.

A large number of optical elements 1040 can be produced with a high precision all together by the following method.

Figure 17A:
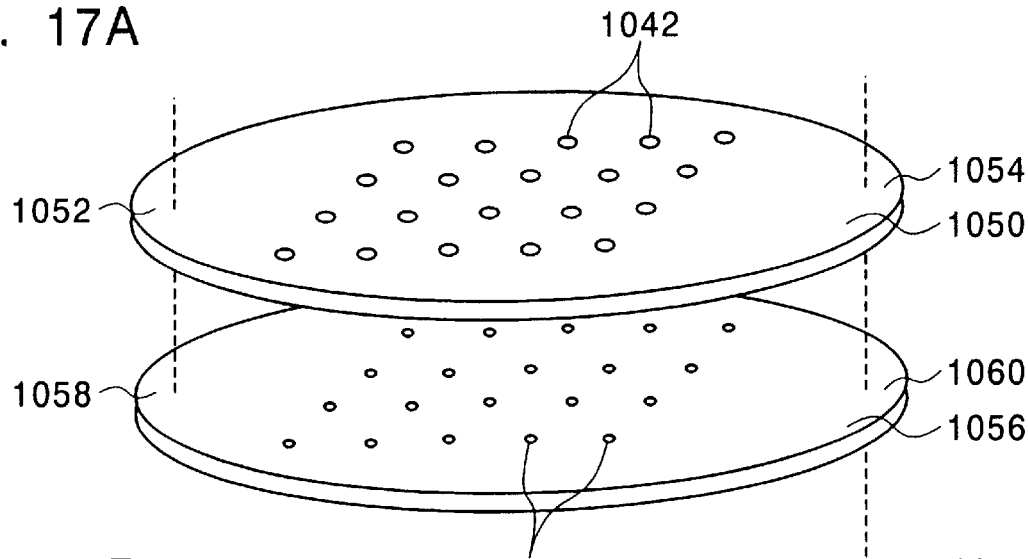
FIG. 17A is a perspective view of a method of fabrication of the optical element.
Figure 17B:
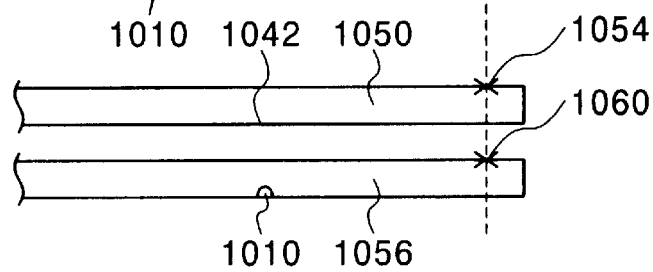
FIG. 17B is a partial sectional side view of part of FIG. 17A.

FIG. 17A is a perspective view of the method for producing an optical element 1040, while FIG. 17B is a partial sectional side view of part of FIG. 17A.

As shown in FIG. 17A, a glass substrate 1050 circular when seen from a plan view is formed with a large number of lenses 1042 arranged in a matrix at a constant pitch. Also, two different positions of the peripheral portion of the glass substrate 1050 are formed with marks 1052 and 1054 by for example small holes of the surface portion in a constant positional relationship with the lens 1042.

A large number of lenses 1010 are similarly arranged on a glass substrate 1056 in a matrix with the same pitch as that of the lenses 1042. Two different positions on the peripheral portion of the glass substrate 1056 are formed with marks 1058 and 1060 by for example small holes of the surface portion in a constant positional relationship with the lenses 1010. The positional relationship of the marks 1052 and 1054 with respect to the lenses 1042 and the positional relationship of the marks 1058 and 1060 with respect to the lenses 1010 become the same.

Such glass substrates 1050 and 1056 are brought into close contact and bonded so that the surfaces face each other and the marks 1052 and 1054 and the marks 1058 and 1060 coincide, then the floating use rails are formed by forming grooves sandwiching the lenses 1010 by using the photoresist mask for every column of for example the lenses 1010 in the surface outside of the glass substrate 1056. By cutting the glass substrates 1050 and 1056 to rectangles when seen from a plan view for every set of the lens 1010 and lens 1042, the optical element 1040 shown in FIG. 21 is obtained.

In this method of production, since use is made of marks 1052, 1054, 1058, and 1060 for positioning as mentioned above, the large number of lenses 1010 and 1042 can be precisely and easily positioned. Further, when forming the grooves in order to form the floating use rails as well, the photoresist can be patterned by using the marks 1052, 1054, 1058, and 1060 to easily and precisely form the floating use rails. As a result, a reduction of price of the optical element can be realized.

Figure 18A:
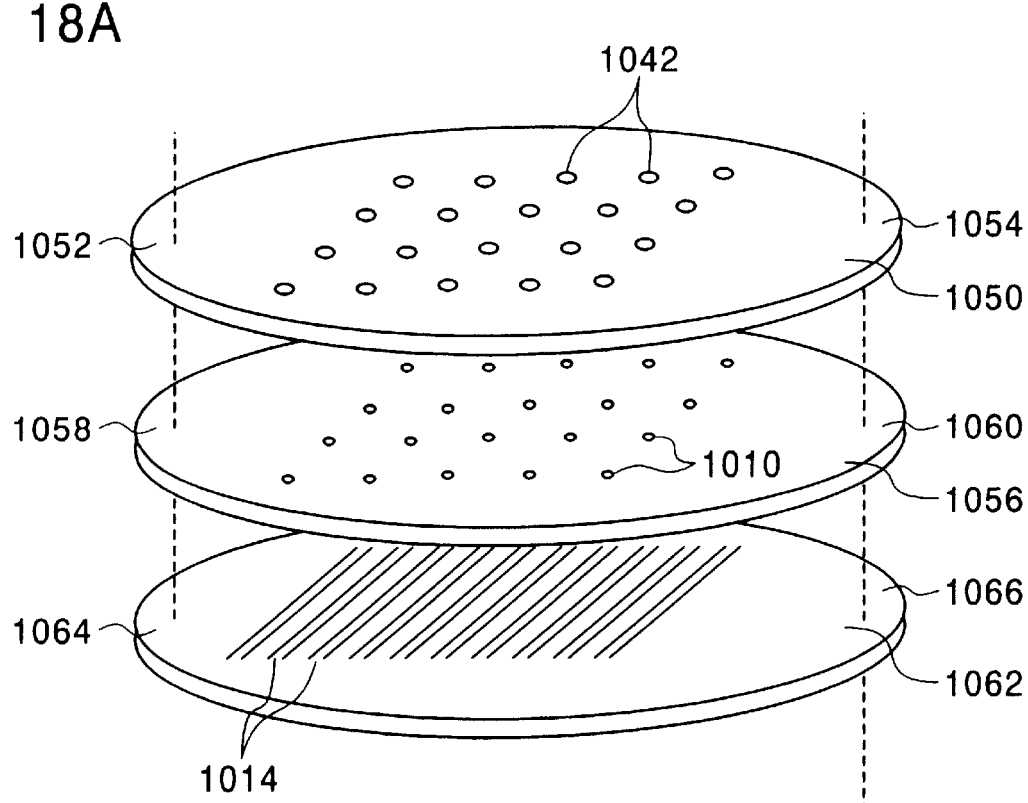
FIG. 18A is a perspective view of another method of fabrication of the optical element.
Figure 18B:
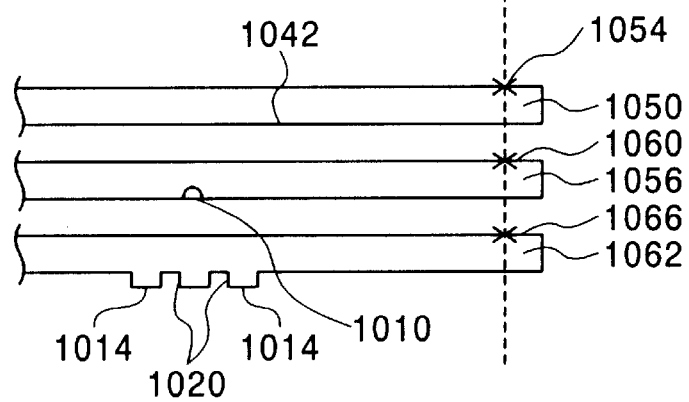
FIG. 18B is a partial sectional side view of part of FIG. 18A.
Figure 19A:
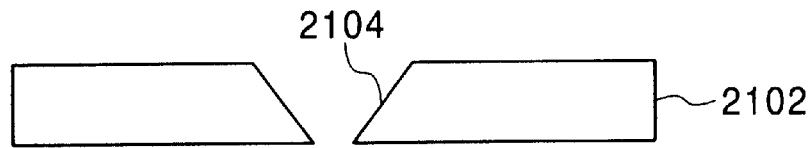
FIGS. 19A to 19E are views showing of the process for fabricating a conventional optical element.
Figure 19B:
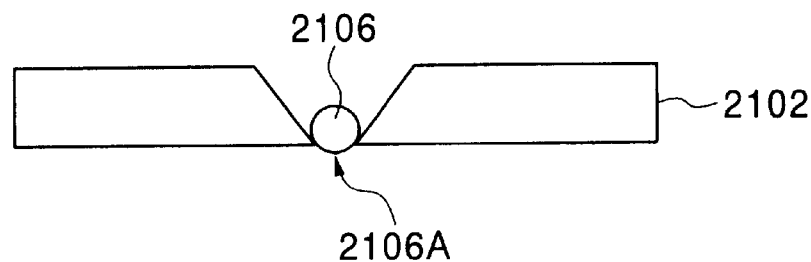
Figure 19C:
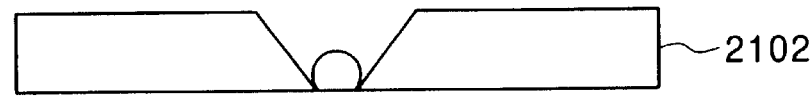
Figure 19D:
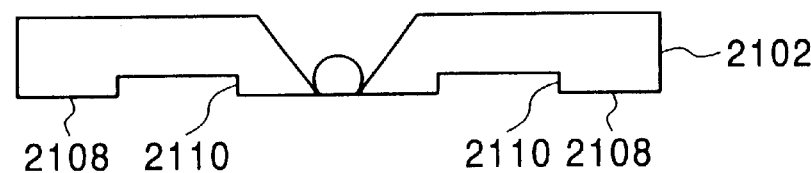
Figure 19E:
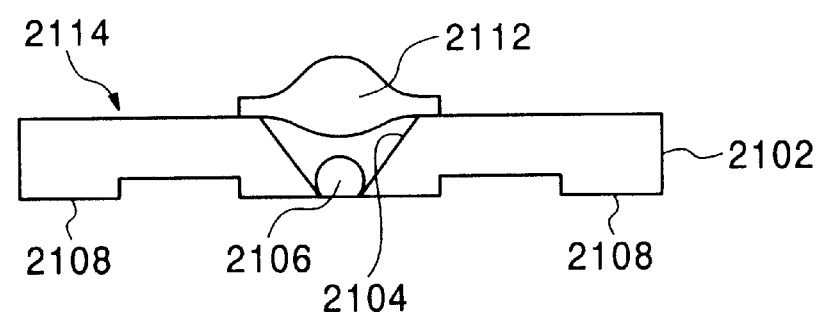

FIG. 18A is a perspective view of another method for producing an optical element 1040, while FIG. 18B is a partial sectional side view of part of FIG. 18A. In the figures, the same reference numerals are assigned to the same elements as those of FIGS. 17A to 17B.

The method of production shown in FIGS. 18A to 18B differs from the method of production of FIG. 22 in the point of bonding a transparent substrate 1062 circular when seen from a plan view and made of a transparent material formed with the grooves 1020 and accordingly the floating use rails 1014 to the glass substrate 1056. In this case as well, the transparent substrate 1062 is formed with marks 1064 and 1066 by for example small holes of the surface portion at two different positions of the peripheral portion thereof by a constant positional relationship with the floating use rails 1014. Then, when bonding the transparent substrate 1062 to the glass substrate 1056, the floating use rails 1014 can be arranged with a high precision with respect to the lenses 1010 by bringing the marks 1064 and 1066 into register with the marks 1058 and 1060.

Further, the embodiments are examples of the present invention. The present invention is not limited to the embodiments.

As described above, the present invention exhibits the excellent effects that an optical element which can be easily produced and is inexpensive in production cost, a production mold of the optical element, and a method for producing an optical element can be provided.

Industrial Applicability

The optical element and optical system of the present invention can be used as an object lens portion of an optical pickup of an optical disk device or other optical parts.

What is claimed is:

1. An optical element having a substrate made of an optical material, said optical element characterized in that:
   one surface of said substrate is formed with a convex portion having a first curvature,
   another surface facing the convex portion of said one surface of said substrate is formed with a concave portion having a second curvature,
   said concave portion is filled with an optical material having a refractive index different from said substrate, and
   said another surface is coated with a protective film made of a transparent material having a higher hardness than said optical material forming said substrate and containing carbon as a principle component.

2. An optical element as set forth in claim 1, characterized in that said convex portion and said concave portion have shapes axially symmetric or approximately axially symmetric with respect to their optical axes, a first flat portion is formed around said convex portion in said one surface, a second flat portion is formed around said concave portion in said other surface, and said first and second flat portions are made parallel or approximately parallel to each other.

3. An optical element as set forth in claim 2, characterized in that the surface of said optical material filled in said concave portion and said second flat portion are made parallel or approximately parallel to each other.

4. An optical element as set forth in claim 2, characterized in that the optical axes of said convex portion and concave portion are positioned on an identical straight line or approximately identical straight line.

5. An optical element as set forth in claim 3, characterized in that the surface of said optical material filled in said concave portion and said second flat portion are positioned on the identical plane or approximately identical plane.

6. An optical element as set forth in claim 1, characterized in that the radii of curvature of the surfaces of said convex portion and said concave portion are made constant or approximately constant.

7. An optical element having a substrate made of an optical material, characterized in that:
   one surface of said substrate is formed with a hole,
   a bottom of said hole is formed with a convex portion having a first curvature, and
   another surface is coated with a protective film made of a transparent material having a higher hardness than said optical material forming said substrate and containing carbon as a principle component.

8. An optical element as set forth in claim 7, characterized in that the other surface facing said one surface of said substrate is formed with a concave portion having a second curvature.

9. An optical element as set forth in claim 8, characterized in that said convex portion and said concave portion have a shape axially symmetric or approximately axially symmetric around their optical axes, a first flat portion is formed around said hole in said one surface, a second flat portion is formed around said concave portion in said other surface, and said first and second flat portions are made parallel or approximately parallel to each other.

10. An optical element as set forth in claim 9, characterized in that said convex portion at the bottom of said hole is positioned between a plane passing through said first flat portion and said second surface.

11. An optical element as set forth in claim 9, characterized in that the optical axes of said convex portion and concave portion are positioned on an identical straight line or approximately identical straight line.

12. An optical element as set forth in claim 8, characterized in that the radii of curvature of the surfaces of said convex portion and said concave portion are made constant or approximately constant.

13. An optical element as set forth in claim 8, characterized in that said concave portion is filled with an optical material having a refractive index different from said substrate.

14. An optical element as set forth in claim 13, characterized in that the surface of said optical material filled in said concave portion and said second flat portion are made parallel or approximately parallel to each other.

15. An optical element as set forth in claim 14, characterized in that the surface of the optical material filled in said concave portion and said second flat portion are positioned on an identical plane or approximately identical plane.

16. An optical element including a substrate made of an optical material and a lens supported on said substrate, characterized in that:
    said substrate is formed by a transparent material of a first refractive index,
    said lens is formed as a lens obtained by filling a concave portion formed in one surface of said substrate with a transparent material having a second refractive index different from said transparent material,
    a surface of said substrate on said lens side is formed with floating use rails integral with said substrate, and
    the surface of said substrate on said lens side is coated with a protective film made of a transparent material having a higher hardness than said transparent material forming said substrate and containing carbon as a principle component.

17. An optical element as set forth in claim 16, characterized in that said substrate is formed by silica-based glass.

18. An optical element as set forth in claim 16, characterized in that the surface of said substrate at said lens side and said protective film have formed between them a second protective film made of a transparent material having a higher hardness than said substrate but having a lower hardness than said protective film.

19. An optical element as set forth in claim 18, characterized in that said second protective film is formed by alumina, silica-based material, or silicon nitride.

20. An optical element including a substrate made of an optical material and a lens supported on said substrate, characterized in that:
    said substrate includes first and second substrates formed by transparent materials,
    said lens is formed as a lens obtained by filling a concave portion having a first curvature formed in one surface of said first substrate with a transparent material having a second refractive index different from the refractive index of the transparent material forming said first substrate,
    said second substrate is made of a transparent material having a higher hardness than said transparent material for forming said first substrate,
    the surface is arranged so as to face the surface of said first substrate on said lens side and closely adhere with said first substrate,
    floating use rails are formed on the surface of said second substrate on an opposite side to said first substrate integrally with said second substrate, and
    the surface of said second substrate on said floating rail side is coated with a transparent protective film having a higher hardness than said transparent material forming said second substrate and containing carbon as a principal component.

21. An optical element as set forth in claim 20, characterized in that said transparent material forming said first substrate is silica-based glass.

22. An optical element as set forth in claim 20, characterized in that said transparent material forming said second substrate is alumina, silica-based glass, or silicon nitride.

23. An optical element as set forth in claim 20, characterized in that said protective film is a diamond-like carbon film.

24. An optical element as set forth in claim 23, characterized in that a thickness of said protective film is at least 5 nm.

25. A production use mold of an optical element made of an optical material, characterized by comprising:
    a cavity to be filled with said optical material in a molten state or a softened state,
    a first pin forming a convex portion or a concave portion with respect to said optical material in said cavity, and
    a second pin for forming a positioning use mark at said optical material in said cavity, wherein
    said first pin penetrates through a wall of said cavity from the outside,
    a front end of said first pin has a concave shape sunken with a first curvature at its center, and
    said second pin penetrates through the wall of said cavity from the outside.

26. A production use mold of an optical element as set forth in claim 25, characterized in that the front end of said first pin has a shape axially symmetric or approximately axially symmetric with respect to the axial center.

27. A production use mold of an optical element as set forth in claim 25, characterized in that, at the front end of said first pin, a radius of curvature of said center portion is constant or approximately constant.

28. A production use mold of an optical element as set forth in claim 25, characterized in that said first pin penetrates through the wall of said cavity from the outside and projects into said cavity.

29. A production use mold of an optical element as set forth in claim 25, characterized in that, at the wall of said cavity, a periphery of a region through which said first pin penetrates is flat and the bottom of said concave shape in the front end of said first pin is positioned between a plane passing through the periphery of said first pin at the wall of said cavity and an opposing wall facing the wall of the cavity.

30. A method of producing an optical element using a disk-like first substrate formed with a plurality of first lenses and a plurality of positioning use first marks and made of an optical material and a disk-like second substrate formed with a plurality of second lenses corresponding to said plurality of first lenses and a plurality of positioning use second marks corresponding to said plurality of positioning use first marks and made of an optical material to produce an optical element,
    said method for producing an optical element characterized in that:
    an arrangement of center positions of said plurality of first lenses and the positions of said plurality of first marks on the surface of said disk-like first substrate coincides with the arrangement of center positions of said corresponding plurality of second lenses and the positions of said plurality of second marks on the surface of said disk-like second substrate and in that the method includes:
    a step of bonding said first and second substrates so that said first and second marks are superimposed and
    a step of separating said bonded first and second substrates into individual optical elements comprised by said first and second lenses.

31. A method of producing an optical element as set forth in claim 30, characterized in that said plurality of first marks are formed on an opposing surface facing said second substrate in the surface of said first substrate, and said plurality of second marks are formed on an opposing surface facing said first substrate in the surface of said second substrate.

32. A method of producing an optical element as set forth in claim 30, characterized in that said first substrate is formed with a plurality of holes corresponding to said plurality of first lenses, bottom surfaces of said plurality of holes are formed with convex portions having axially symmetric shapes about their axial centers, and said convex portions constitute said first lenses.

33. A method of producing an optical element including a substrate made of an optical material and a lens supported on said substrate,
    said method for producing an optical element characterized by including the steps:
        preparing a transparent substrate having a lens formed by filling a concave portion of one surface with a transparent material,
        forming a photoresist film on the surface of said substrate at said lens side,
        patterning said lens portion and said photoresist film to the shape of a support by photolithography,
        dry etching said surface of said substrate using said photoresist film as a mask to form grooves,
        removing said photoresist film to obtain said optical element, and
        coating the surface of said lens side of said substrate with a protective film having a higher hardness than said transparent material forming said substrate and containing carbon as a principle component.

34. A method of producing an optical element as set forth in claim 33, characterized in that said substrate is formed by glass.

35. A method of producing an optical element as set forth in claim 33, characterized in that after removing said photoresist film and before the formation of said protective film, said surface of said substrate is formed with a second protective film made of a transparent material having a higher hardness than said substrate but having a lower hardness than said protective film.

36. A method of producing an optical element as set forth in claim 35, characterized in that said second protective film is formed by alumina, silica-based glass, or silicon nitride.

37. A method of producing an optical element as set forth in claim 33, characterized in that said protective film containing carbon as a principal component is a diamond-like carbon film.

38. A method of producing an optical element including a substrate made of an optical material and a lens supported on said substrate,
    said method for producing an optical element characterized by including the steps of:
        preparing a transparent first substrate having a lens formed by filling a concave portion of one surface with a transparent material,
        depositing on the surface on said lens side of said first substrate a transparent material having a higher hardness than said first substrate to obtain a second substrate closely adhered to said first substrate,
        forming a photoresist film on the surface of said second substrate at the side opposite to said first substrate,
        patterning said photoresist film to the shape of floating use rails by photolithography,
        dry etching said surface of said second substrate using said photoresist mask as a mask to form grooves in said surface of said second substrate,
        then removing said photoresist film to obtain said optical element.

39. A method of producing an optical element including a substrate made of an optical material and a lens supported on said substrate,
    said method for producing an optical element characterized in that:
        said optical element is formed by bonding with a transparent first substrate having a lens formed by filling a concave portion of one surface with a transparent material a second substrate made of a transparent material having a higher hardness than said first substrate while making its surface face the surface on said lens side of said first substrate and in that it comprises the steps of:
        forming a photoresist film on the surface of said second substrate on the opposite side to said first substrate before bonding said second substrate to said first substrate or after bonding said second substrate to said first substrate,
        patterning said photoresist film to the shape of floating use rails by photolithography,
        dry etching said surf ace of said second substrate using said photoresist mask as a mask to form grooves in said surface of said second substrate,
        then removing said photoresist film to obtain said optical element.

40. A method of producing an optical element as set forth in claim 38 or 39, characterized in that said first substrate is formed by glass.

41. A method for producing an optical element as set forth in claim 38 or 39, characterized in that said second substrate is formed by alumina, silica-based glass, or silicon nitride.

42. A method producing an optical element as set forth in claim 38 or 39, characterized in that after removing said photoresist film on said second substrate, a protective film having a higher hardness than said second material and containing carbon as a principal component is formed on the surface of said groove side.

43. A method of producing an optical element as set forth in claim 42, characterized in that said protective film containing carbon as a principal component is a diamond-like carbon film.

44. A method of producing an optical element as set forth in claim 43, characterized in that said protective film is formed to a thickness of at least 5 nm.

45. A method of producing an optical element as set forth in claim 42, characterized in that said protective film containing carbon as a principal component is a diamond-like carbon film.

46. A method of producing an optical element as set forth in claim 45, characterized in that said protective film is formed to a thickness of at least 5 nm.

* * * * *

UNITED STATES PATENT AND TRADEMARK OFFICE
CERTIFICATE OF CORRECTION

PATENT NO. : 6,717,738 B2
DATED : April 6, 2004
INVENTOR(S) : Masahiro Yamada

It is certified that error appears in the above-identified patent and that said Letters Patent is hereby corrected as shown below:

Column 30,
Line 34, "sur face" should read -- surface --.
Line 45, "method producing" should read -- method of producing --.

Signed and Sealed this

Fourth Day of January, 2005

JON W. DUDAS
*Director of the United States Patent and Trademark Office*